US008879900B2

(12) United States Patent
Nakayama et al.

(10) Patent No.: US 8,879,900 B2
(45) Date of Patent: Nov. 4, 2014

(54) IMAGE BLUR CORRECTION DEVICE AND IMAGING APPARATUS

(71) Applicant: Sony Corporation, Tokyo (JP)

(72) Inventors: Tatsuyuki Nakayama, Kanagawa (JP); Takumi Fukuda, Tokyo (JP); Keishi Kobayashi, Kanagawa (JP); Kazuhiro Hattori, Tokyo (JP); Atsushi Horidan, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/681,549

(22) Filed: Nov. 20, 2012

(65) Prior Publication Data
US 2013/0177301 A1 Jul. 11, 2013

(30) Foreign Application Priority Data

Jan. 5, 2012 (JP) ................................. 2012-000757

(51) Int. Cl.
G03B 17/00 (2006.01)
G02B 27/64 (2006.01)
G03B 5/00 (2006.01)

(52) U.S. Cl.
CPC ................ *G02B 27/64* (2013.01); *G03B 17/00* (2013.01); *G03B 2205/0069* (2013.01); *G02B 27/646* (2013.01); *G03B 2205/0023* (2013.01); *G03B 5/00* (2013.01)
USPC .................... 396/55; 348/207.99; 348/208.99

(58) Field of Classification Search
USPC ........ 396/52–55; 348/208.11, 208.99, 207.99
See application file for complete search history.

(56) References Cited

U.S. PATENT DOCUMENTS

| 4,013,339 | A * | 3/1977 | Ando et al. ................... 359/556 |
| 4,780,739 | A * | 10/1988 | Kawakami et al. ............. 396/54 |
| 7,426,340 | B2 * | 9/2008 | Seo ................. 396/153 |
| 7,496,288 | B2 * | 2/2009 | Seo .................. 396/55 |
| 7,623,159 | B2 * | 11/2009 | Wada et al. ................ 348/222.1 |
| 8,311,404 | B2 * | 11/2012 | Nakayama ...................... 396/55 |
| 2008/0074504 | A1 * | 3/2008 | Sekino ...................... 348/208.99 |
| 2008/0111890 | A1 * | 5/2008 | Inaba ....................... 348/208.99 |
| 2011/0317060 | A1 * | 12/2011 | Nakayama .................... 348/357 |

FOREIGN PATENT DOCUMENTS

JP 07-274056 A 10/1995

* cited by examiner

*Primary Examiner* — Clayton E Laballe
*Assistant Examiner* — Warren K Fenwick
(74) *Attorney, Agent, or Firm* — Rader, Fishman & Grauer PLLC

(57) ABSTRACT

An image blur correction device includes a lens unit which has at least one lens, and can be pivoted in two directions, which are orthogonal to each other, with respect to an outer housing, and a first driving motor and second driving motor which pivot the lens unit in the directions, in which a coil body having a plurality of coil sections, and a magnet placed to face the plurality of coil sections, are provided in the first driving motor and the second driving motor, a placement area, in which the plurality of coil sections are placed and a non-placement area, in which there are no coil sections, are formed, and the outer circumference of the non-placement area is positioned to the inside of a virtual circle that links the outer circumferences of each coil section in each plurality of coil section.

16 Claims, 22 Drawing Sheets

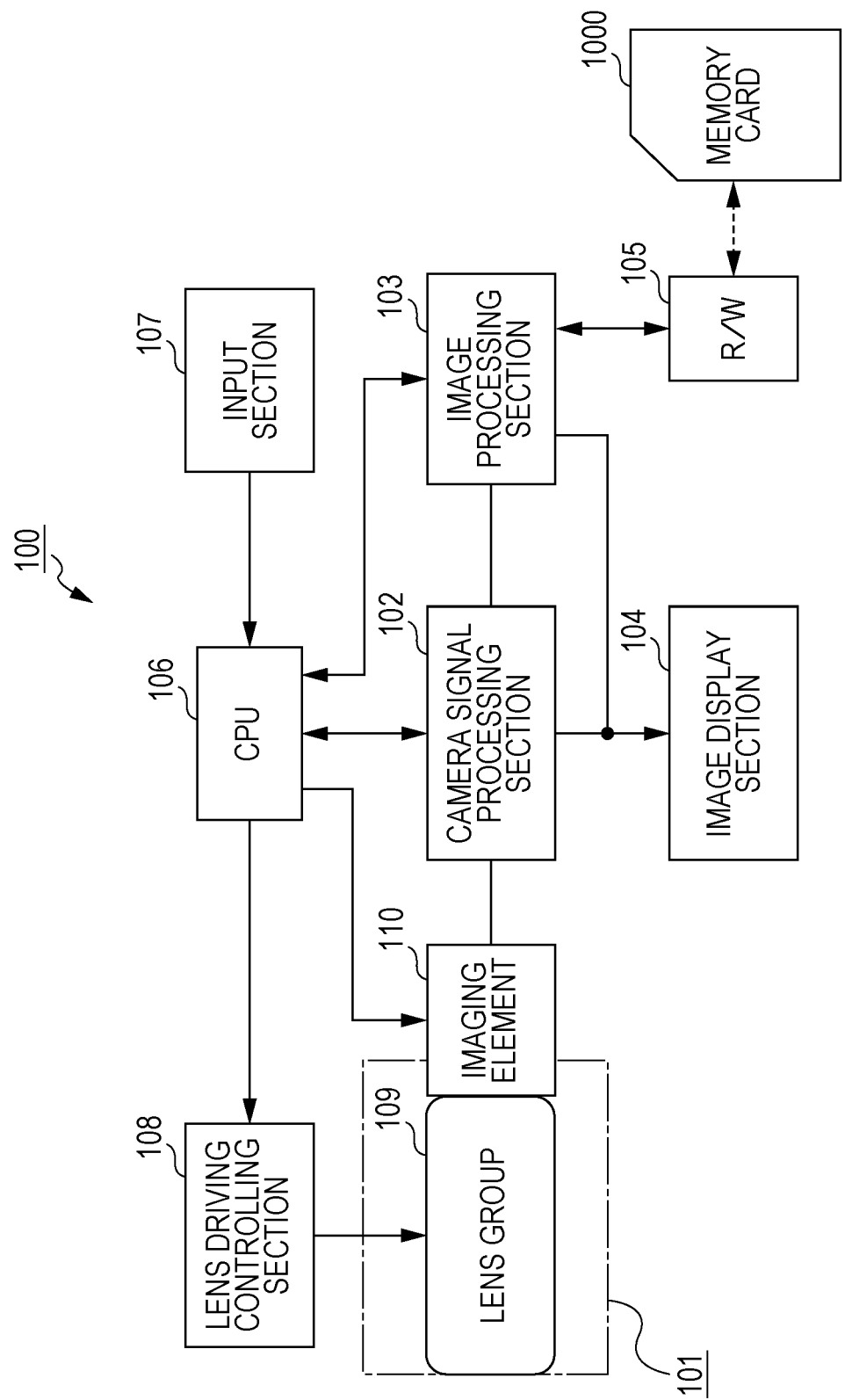

IMAGE BLUR CORRECTION DEVICE AND IMAGING APPARATUS

BACKGROUND

The present technology relates to the technical field concerning image blur correction devices and imaging apparatuses. More specifically, the present technology relates to the technical field in which miniaturization is achieved by forming a non-placement area, in which there are no coil sections, in a base section in which a plurality of coil sections are placed, and setting the outer circumference of the non-placement area to a predetermined position.

In imaging apparatuses such as video cameras and still cameras, there are some apparatuses that are provided with an image blur correction device that performs image blur correction by moving a lens in a direction orthogonal to the direction of the optical axis direction.

In such image blur correction devices provided in imaging apparatuses, there are some devices that have a lens unit which has a lens, and can be pivoted in a first direction which is a revolving direction of a first pivot axis that is orthogonal to the optical axis of the lens, and a second direction which is the revolving direction of a second pivot axis that is orthogonal to both the optical axis and the first pivot axis, with respect to an outer housing (for example, refer to Japanese Unexamined Patent Application Publication No. 7-274056).

The lens unit performs image blur correction by being pivoted in the yaw direction with the first pivot axis as a pivot point and the pitch direction with the second pivot axis as a pivot point.

In the image blur correction device disclosed in Japanese Unexamined Patent Application Publication No. 7-274056, two driving motors (flat motors), which respectively have a plurality of coil sections, a magnet and a yoke, are used as driving sections to pivot the lens unit in the yaw direction and the pitch direction. The plurality of coil sections are placed side by side in the revolving direction of a pivot axis (circumferential direction) and north and south magnetic poles of the magnets are alternately magnetized in the revolving direction of the pivot axis (circumferential direction). The axial directions of output shafts of each of the driving motors are respectively consistent with the first pivot axis and the second pivot axis.

The driving motors are configured such that the coil sections and the magnets are placed to face each other, and so as to pivot the lens unit in the yaw direction and the pitch direction using a propulsion force that is generated by the relationship between the coil sections and the magnets when an electric current is supplied to the coil sections.

One driving motor is, for example, arranged at the upper surface-side of the lens unit in a direction that faces the vertical direction, and is configured so as to pivot the lens unit in the yaw direction according to the direction of current supply when an electric current is supplied to the coil sections. The other driving motor is, for example, arranged at the lateral surface-side of the lens unit in a direction that faces the horizontal direction, and is configured so as to pivot the lens unit in the pitch direction according to the direction of current supply when an electric current is supplied to the coil sections.

SUMMARY

However, in the image blur correction device disclosed in Japanese Unexamined Patent Application Publication No. 7-274056, the plurality of coil sections are placed separately at regular intervals in the circumferential direction, and thus the overall size of the image blur correction device is dependent on the size of a circle that links the outer circumferences of the plurality of coil sections.

That is, there is a problem in that, since it may be difficult to make the size in a direction that is orthogonal to the output shafts of the driving motors of the image blur correction device smaller than the size of a circle that links the outer circumferences of the plurality of coil sections, a tendency towards larger image blur correction devices and imaging apparatuses provided therewith is caused by the presence of the coil sections.

Accordingly, in the image blur correction device and the imaging apparatus of an embodiment of the present technology, it is desirable to overcome the above-mentioned problem and achieve miniaturization in a configuration in which the lens unit is pivoted in a revolving direction of the first pivot axis and the revolving direction of the second pivot axis.

According to an embodiment of the present technology, there is provided an image blur correction device including a lens unit which has at least one lens, and can be pivoted in a first direction which is a revolving direction of a first pivot axis that is orthogonal to an optical axis of the lens, and a second direction which is a revolving direction of a second pivot axis that is orthogonal to both the optical axis and the first pivot axis, with respect to an outer housing, a first driving motor which pivots the lens unit in the first direction, and a second driving motor which pivots the lens unit in the second direction, wherein the first driving motor and the second driving motor are provided with a coil body which has a plurality of coil sections placed in a base section in a separated state in a circumferential direction based on the base section and each of the pivot axes, and a magnet which is placed to face the plurality of coil sections, a placement area in which the plurality of coil sections are placed and a non-placement area which is positioned between both ends of the placement area in the circumferential direction and in which there are no coil sections, are formed in the base sections, and the outer circumference of the non-placement area is positioned to the inside of a virtual circle that links the outer circumferences of the plurality of coil sections.

Accordingly, the overall size of the image blur correction device is set depending on the positions of the outer circumferences of the non-placement areas in the base sections of the coil bodies.

It is desirable to provide an image blur correction device including magnetic detection elements which perform position detection in the pivot directions of the lens unit and placed in the non-placement areas of the base sections.

By placing magnetic detection elements, which perform position detection in the pivot directions of the lens unit, dedicated spaces for magnetic detection elements are not necessary in the non-placement areas of the base sections.

It is desirable to provide an image blur correction device in which magnetic detection elements are placed in positions facing the magnets.

By placing the magnetic detection elements in positions facing the magnets, in addition to securing miniaturization of the image blur correction device, it is possible to achieve an improvement in the detection accuracy of the pivot positions of the lens unit using the magnetic detection elements.

It is desirable to provide an image blur correction device in which, in the magnets, magnetic poles magnetized as north and south poles are alternately provided in the circumferential direction, and in a reference position that is at a center of the pivot ranges of the lens unit in the first direction and the second direction, the magnetic detection elements are positioned to face a pole border of the north pole and south pole.

By positioning the magnetic detection elements to face a pole border of a north pole and a south pole in a reference position that is at the center of the pivot ranges of the lens unit in the first direction and the second direction, regions, in which there are few fluctuations in the curve of the magnetic field, can be used to detect the pivot positions of the lens unit.

It is desirable to provide an image blur correction device including propulsion force generation sections which generate propulsion force in the pivot directions of the lens unit and are provided in the coil sections, and in which the propulsion force generation sections are formed in straight lines that extend in a radiation direction centering on the pivot axis.

By providing propulsion force generation sections, which generate propulsion force in the pivot directions of the lens unit, in the coil sections, and forming the propulsion force generation sections in straight lines that extend in a radiation direction centering on a pivot axis, loss of the propulsion force that is applied to the lens unit can be reduced.

It is desirable to provide an image blur correction device in which, in the magnets, magnetic poles magnetized as north and south poles are alternately provided in the circumferential direction and angles based on the pivot axes between the centers of magnetic poles adjacent in the circumferential direction and angles based on the pivot axis between the centers of coil sections adjacent in the circumferential direction are configured to be the same.

By setting angles based on the pivot axes between the centers of magnetic poles adjacent in the circumferential direction and angles based on the pivot axis between the centers of coil sections adjacent in the circumferential direction are configured to be the same, the propulsion forces generated in each coil section can be homogenized.

It is desirable to provide an image blur correction device in which in a reference position that is at the center of the pivot ranges of the lens unit in the first direction and the second direction, the center of each coil section in the plurality of coil sections is positioned to face a pole border of the north pole and the south pole.

By positioning the center of each coil section in the plurality of coil sections to face a pole border of a north pole and a south pole in a reference position that is at the center of the pivot ranges of the lens unit in the first direction and the second direction, the propulsion forces generated in each coil section can be homogenized within the pivot ranges of the lens unit.

It is desirable to provide an image blur correction device in which the non-placement area provided in the coil body of the first driving motor is positioned in a direction that is orthogonal to both the optical axis and the first pivot axis, and the non-placement area provided in the coil body of the second driving motor is positioned in a direction that is orthogonal to both the optical axis and the second pivot axis.

By positioning the non-placement area of the first driving motor in a direction that is orthogonal to both the optical axis direction and the first pivot axis, and the non-placement area of the second driving motor in a direction that is orthogonal to both the optical axis and the second pivot axis, the non-placement area is positioned to the inside of a virtual circle that links the outer circumferences of the plurality of coil sections, is positioned in a direction which is orthogonal to the optical axis.

It is desirable to provide an imaging apparatus including an image blur correction device having a lens unit which has at least one lens, and an outer housing in which the lens unit is placed, which corrects image blur by pivoting the lens unit in a first direction which is a revolving direction of a first pivot axis that is orthogonal to the optical axis of the lens, and a second direction which is a revolving direction of a second pivot axis that is orthogonal to both the optical axis and the first pivot axis, with respect to the outer housing, wherein the image blur correction device is provided with a first driving motor which pivots the lens unit in the first direction, and a second driving motor which pivots the lens unit in the second direction, wherein the first driving motor and the second driving motor are provided with a coil body which has a plurality of coil sections placed in a base section in a separated state in a circumferential direction based on the base section and each of the pivot axes, and a magnet which is placed to face the plurality of coil sections, a placement area in which the plurality of coil sections are placed and a non-placement area which is positioned between both ends of the placement area in the circumferential direction and in which there are no coil sections, are formed in the base sections, and the outer circumference of the non-placement area is positioned to the inside of a virtual circle that links the outer circumferences of the plurality of coil sections.

Accordingly, the overall size of the imaging apparatus is set depending on the position of the outer circumference of the non-placement area in the base section of the coil body.

The image blur correction device according to an embodiment of the present technology is provided with a lens unit which has at least one lens, and can be pivoted in a first direction which is the revolving direction of a first pivot axis that is orthogonal to the optical axis of the lens, and a second direction which is the revolving direction of a second pivot axis that is orthogonal to both the optical axis and the first pivot axis, with respect to an outer housing, a first driving motor which pivots the lens unit in the first direction, and a second driving motor which pivots the lens unit in the second direction, wherein the first driving motor and the second driving motor are provided with a coil body which has a plurality of coil sections placed in a base section in a separated state in a circumferential direction based on the base section and each of the pivot axes, and a magnet which is placed to face the plurality of coil sections, a placement area in which the plurality of coil sections are placed and a non-placement area which is positioned between both ends of the placement area in the circumferential direction and in which there are no coil sections, are formed in the base sections, and the outer circumference of the non-placement area is positioned to the inside of a virtual circle that links the outer circumferences of the plurality of coil sections.

Accordingly, the base sections of the coil bodies are smaller and it is possible to achieve miniaturization of an image blur correction device in a configuration in which the lens unit is pivoted in the revolving direction of the first pivot axis and the revolving direction of the second pivot axis.

According to a second embodiment of the present technology, magnetic detection elements, which perform position detection in the pivot directions of the lens unit, are placed in the non-placement areas of the base sections.

Accordingly, dedicated spaces for magnetic detection elements are not necessary, and it is possible to achieve further miniaturization of an image blur correction device and an imaging apparatus.

According to a third embodiment of the present technology, the magnetic detection elements are placed in positions facing the magnets.

Accordingly, in addition to securing miniaturization of the image blur correction device, it is possible to achieve an improvement in the detection accuracy of the pivot positions of the lens unit using the magnetic detection elements.

According to a fourth embodiment of the present technology, in the magnets, magnetic poles magnetized as north and south poles are alternately provided in the circumferential direction, and in a reference position that is at the center of the pivot ranges of the lens unit in the first direction and the second direction, the magnetic detection elements are positioned to face a pole border of a north pole and a south pole.

Accordingly, it is possible to effectively use regions, in which there are few fluctuations in the curve of the magnetic field, to detect the pivot positions of the lens unit and achieve an improvement in the detection accuracy of the pivot positions of the lens unit.

According to a fifth embodiment of the present technology, propulsion force generation sections, which generate propulsion force in the pivot directions of the lens unit, are provided in the coil sections, and the propulsion force generation sections are formed in straight lines that extend in a radiation direction centering on a pivot axis.

Accordingly, loss of the propulsion force that is applied to the lens unit is reduced, the driving efficiency of the lens unit is improved and it is possible to achieve miniaturization of the image blur correction device by reducing the size of the coil sections by a corresponding amount.

According to a sixth embodiment of the present technology, in the magnets, magnetic poles magnetized as north and south poles are alternately provided in the circumferential direction, and angles based on the pivot axes between the centers of magnetic poles adjacent in the circumferential direction and angles based on the pivot axis between the centers of coil sections adjacent in the circumferential direction are configured to be the same.

Accordingly, the propulsion forces generated in each coil section are homogenized and it is possible to achieve an improvement in the driving efficiency with respect to the first driving motor and the second driving motor of the lens unit.

According to a seventh embodiment of the present technology, in a reference position that is at the center of the pivot ranges of the lens unit in the first direction and the second direction, the center of each coil section in the plurality of coil sections is positioned to face a pole border of a north pole and a south pole.

Accordingly, the propulsion forces generated in each coil section can be homogenized within the pivot ranges of the lens unit and it is possible to achieve an improvement in the driving efficiency with respect to the first driving motor and the second driving motor of the lens unit.

According to an eighth embodiment of the present technology, the non-placement area provided in the coil body of the first driving motor is positioned in a direction that is orthogonal to both the optical axis and the first pivot axis, and the non-placement area provided in the coil body of the second driving motor is positioned in a direction that is orthogonal to both the optical axis and the second pivot axis.

Accordingly, the non-placement area which is positioned to the inside of a virtual circle that links the outer circumferences of the plurality of coil sections, are positioned in a direction which is orthogonal to the optical axis direction, and it is possible to achieve miniaturization of the image blur correction device since it is possible to reduce the size of the outer shape of the image blur correction device.

The imaging apparatus according to an embodiment of the present technology is provided with an image blur correction device having a lens unit which has at least one lens, and an outer housing in which the lens unit is placed, which corrects image blur by pivoting the lens unit in a first direction which is a revolving direction of a first pivot axis that is orthogonal to the optical axis of the lens, and a second direction which is a revolving direction of a second pivot axis that is orthogonal to both the optical axis and the first pivot axis, with respect to the outer housing, wherein the image blur correction device is provided with a first driving motor which pivots the lens unit in the first direction, and a second driving motor which pivots the lens unit in the second direction, wherein a coil body which has a plurality of coil sections placed in a base section in a separated state in a circumferential direction based on the base section and each of the pivot axes, and a magnet which is placed to face the plurality of coil sections, are provided in the first driving motor and the second driving motor, a placement area, in which the plurality of coil sections are placed and a non-placement area which is positioned between both ends of the placement area in the circumferential direction and in which there are no coil sections, are formed in the base sections, and the outer circumference of the non-placement area is positioned to the inside of a virtual circle that links the outer circumferences of the plurality of coil sections.

Accordingly, the base sections of the coil bodies are smaller and it is possible to achieve miniaturization of an imaging apparatus in a configuration in which the lens unit is pivoted in the revolving direction of the first pivot axis and the revolving direction of the second pivot axis.

BRIEF DESCRIPTION OF THE DRAWINGS

FIG. 22 is a block diagram of the image blur correction device.

DETAILED DESCRIPTION OF EMBODIMENTS

Hereinafter, preferred embodiments of the image blur correction device and the imaging apparatus according to an embodiment of the present technology will be described according to the attached drawings.

The preferred embodiments indicated below are the imaging apparatus according to an embodiment of the present technology applied to a video camera and the image blur correction device according to an embodiment of the present technology applied to an image blur correction device installed in a video camera.

Additionally, the respective scopes of applications of the imaging apparatus and image blur correction device according to an embodiment of the present technology are not limited to a video camera and an image blur correction device installed in a video camera. The imaging apparatus and image blur correction device according to an embodiment of the present technology can be applied widely in imaging apparatuses installed in various types of hardware such as still cameras, mobile telephones and PDAs (Personal Digital Assistants) and image blur correction devices installed in such imaging apparatuses.

The description below indicates the directions of front, back, up, down, left and right from the point of view of a user during image capture with a video camera. Accordingly, the side of the object of image capture is the front and the side of a user is the back.

Additionally, the directions of front, back, up, down, left and right indicated below are for the convenience of description and the embodiments of the present technology are not limited to these directions.

In addition, the lens indicated below includes the meaning of both a lens configured by a single lens and a lens group configured by a plurality of lenses.

Overall Configuration of Imaging Apparatus

Figure 1:
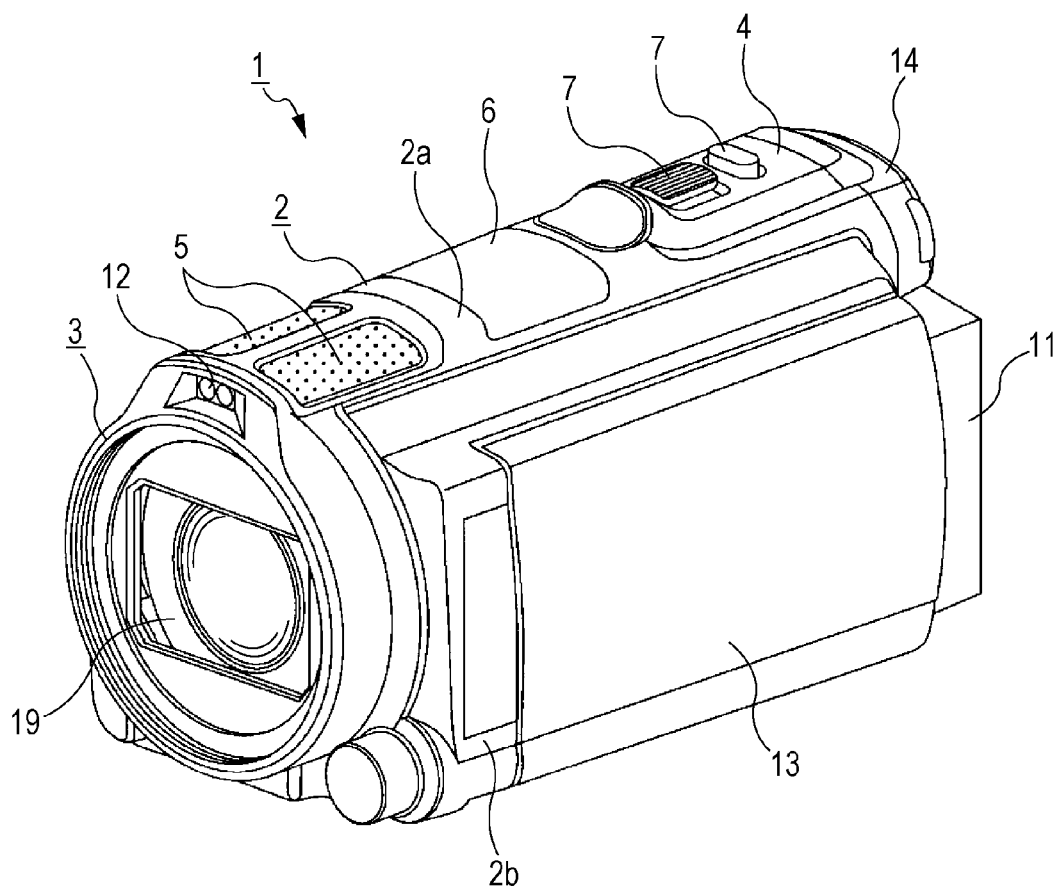
FIG. 1 is a perspective view of an imaging apparatus and together with FIGS. 2 to 22 shows an imaging apparatus according to an embodiment of the present technology.
Figure 2:
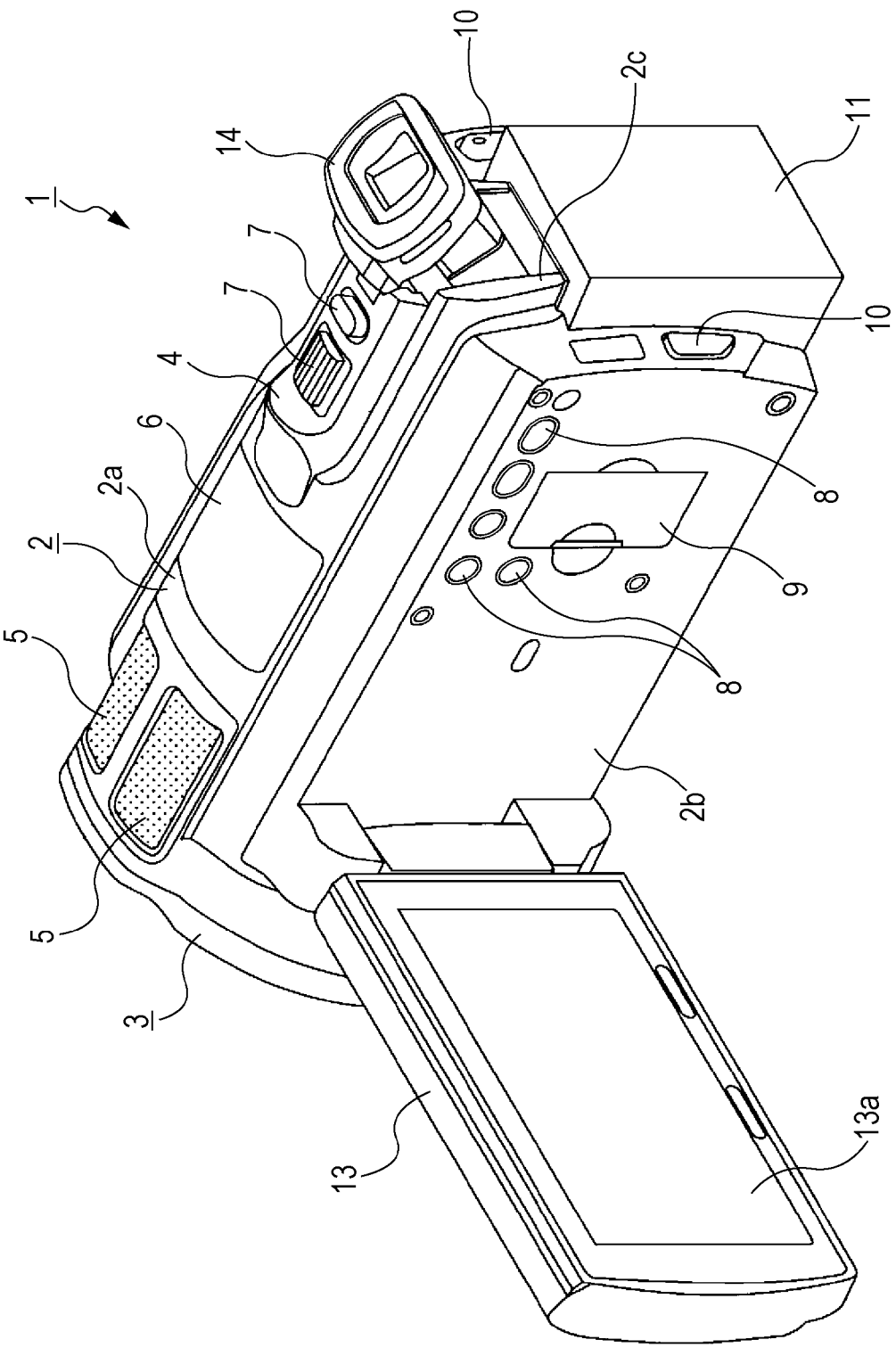
FIG. 2 is a perspective view of the imaging apparatus, shown in a state of being viewed from a different direction to FIG. 1.

An imaging apparatus 1 is formed by various desired parts being placed inside and outside an outer housing 2 (Refer to FIGS. 1 and 2). The outer housing 2 is, for example, formed in a case form that is long in the longitudinal direction, the front end portion thereof is provided as a front panel section 3, and the upper end portion of the back end portion thereof is provided as a storage case 4 with an opening at the back thereof.

Microphones 5,5, an interface cover 6 and operation switches 7,7 are placed in order from the front side of an upper surface 2a of the outer housing 2. The operation switches 7,7 are, for example, a zoom lever and an image capture button.

Various types of operation buttons 8,8 . . . such as a power button and an image reproduction button are placed on a side surface 2b of the outer housing 2. A memory card 9 is placed in the side surface 2b of the outer housing 2.

Various operation buttons 10,10 such as a mode switch button and a record button are placed on a back surface 2c of the outer housing 2.

A battery 11 is fitted to the back surface of the outer housing 2 and a portion of the battery 11 protrudes from the back of the back surface 2c of the outer housing 2.

A flash 12 is placed in the upper end portion of the front panel section 3. The flash 12 is used during image capture at night, or the like, and fill light is output from the flash 12 toward the front.

A display section 13 is pivotally and rotatably connected to a side portion of the outer housing 2. The display section 13 includes a display surface 13a, the front end portion of which is connected to the outer housing 2.

A viewfinder 14 is connected to the back end portion of the imaging apparatus 1 and the viewfinder 14 is slidable in the longitudinal direction and pivotable in the tilt direction with respect to the storage case 4.

The viewfinder 14 is slidable between a storage position in which a portion other than the back end portion thereof is stored in the storage case 4 and an extracted position in which the viewfinder 14 is extracted from the storage case 4. In addition, in the extracted position, the viewfinder 14 is pivotable in the tilt direction with the front end portion thereof as a pivot point.

Configuration of Image Blur Correction Device

An image blur correction device 15 is placed inside the outer housing 2 (refer to FIGS. 3 to 8). The image blur correction device 15 includes an outer frame 16, an inner frame 17, a holding frame 18 and a lens unit 19.

The outer frame 16 is configured by joining a first member 20 and a second member 21.

The first member 20 is formed of a first surface section 22 that faces the vertical direction and a second surface section 23 that faces the horizontal direction, and the right end portion of the first surface section 22 and the upper end portion of the second surface section 23 are continuous. An insertion through hole 22a is formed in the central portion of the first surface section 22. The second surface section 23 includes a pair of pillar sections 24,24 that are positioned at the front and back of the second surface section 23 and extend substantially up and down, and a connection section 25 that connects the respective lower end portions of the pillar sections 24,24 and extends to the front and back. The upper end portions of the pillar sections 24,24 are provided as inclined sections 24a,24a that are inclined so as to be displaced to the left as they proceed upward, and the upper end portions of the inclined sections 24a,24a are respectively continuous with the front and back end portions of the right end portion of the first surface section 22.

The second member 21 is formed of a first planar section 26 that faces the vertical direction and a second planar section 27 that faces the horizontal direction, and the left end portion of the first planar section 26 and a lower end portion of the second planar section 27 are continuous. A placement hole 26a is formed in the central portion of the first planar section 26. An insertion placement hole 27a is formed in the central portion of the second planar section 27. Inclined sections 27b,27b that are inclined so as to be displaced to the right as they proceed upward are provided at both the front and back end portions of the upper end portion of the second planar section 27.

The lower end portion of the second surface section 23 in the first member 20 and the right end portion of the first planar section 26 in the second member 21 are joined by a fastening screw or the like.

The inner frame 17 is placed inside the outer frame 16 and is configured by joining a first support member 28 and a second support member 29.

The first support member 28 is formed of a top side section 30 that faces the vertical direction and a right side section 31 that faces the horizontal direction, and the right end portion of the top side section 30 and the upper end portion of the right side section 31 are continuous. An insertion placement hole 30a is formed in the central portion of the top side section 30. An insertion hole 31a is formed in the central portion of the right side section 31.

The second support member 29 is formed of a bottom side section 32 that faces the vertical direction and a left side section 33 that faces the horizontal direction, and the left end portion of the bottom side section 32 and the lower end portion of the left side section 33 are continuous. A fixing hole 32a is formed in the central portion of the bottom side section 32. A placement hole 33a is formed in the central portion of the left side section 33.

The lower end portion of the right side section 31 in the first support member 28 and the right end portion of the bottom side section 32 in the second support member 29 are joined by a fastening screw or the like, and the left end portion of the top side section 30 in the first support member 28 and the upper end portion of the left side section 33 in the second support member 29 are joined by a fastening screw or the like.

The holding frame 18 is placed inside the inner frame 17 and is configured by joining a first fixing member 34 and a second fixing member 35.

The first fixing member 34 is formed of an upper surface section 36 that faces the vertical direction and a right side surface section 37 that faces the horizontal direction, and the right end portion of the upper surface section 36 and the upper end portion of the right side surface section 37 are continuous. An insertion placement hole 37a is formed in the central portion of the right side surface section 37.

The second fixing member 35 is formed of a lower surface section 38 that faces the vertical direction and a left side surface section 39 that faces the horizontal direction, and the left end portion of the lower surface section 38 and the lower end portion of the left side surface section 39 are continuous. A fixing hole 39a is formed in the central portion of the left side surface section 39.

The lower end portion of the right side surface section 37 in the first fixing member 34 and the right end portion of the lower surface section 38 in the second fixing member 35 are joined by a fastening screw or the like, and the left end portion of the upper surface section 36 in the first fixing member 34 and the upper end portion of the left side surface section 39 in the second fixing member 35 are joined by a fastening screw or the like.

The lens unit 19 is placed inside the holding frame 18 and includes a lens barrel 40, a plurality of lenses 41,41, placed side by side in the front and back inside the lens barrel 40 and an imaging unit 42 fixed to the back end portion of the lens barrel 40. The lens barrel 40 is formed in a shape that is long from front to back. The imaging unit 42 includes an imaging element such as a CCD (Charge Coupled Device) or a CMOS (Complementary Metal-Oxide Semiconductor), which is not shown in the drawings.

On the front surface of the lens barrel 40, a cover member 43 is fixed to the outer circumferential side of the lens 41 positioned furthest toward the front side. The cover member 43 is formed in a circular ring shape and the front surface thereof is formed in a spherical shape that is convex at the front.

Figure 4:
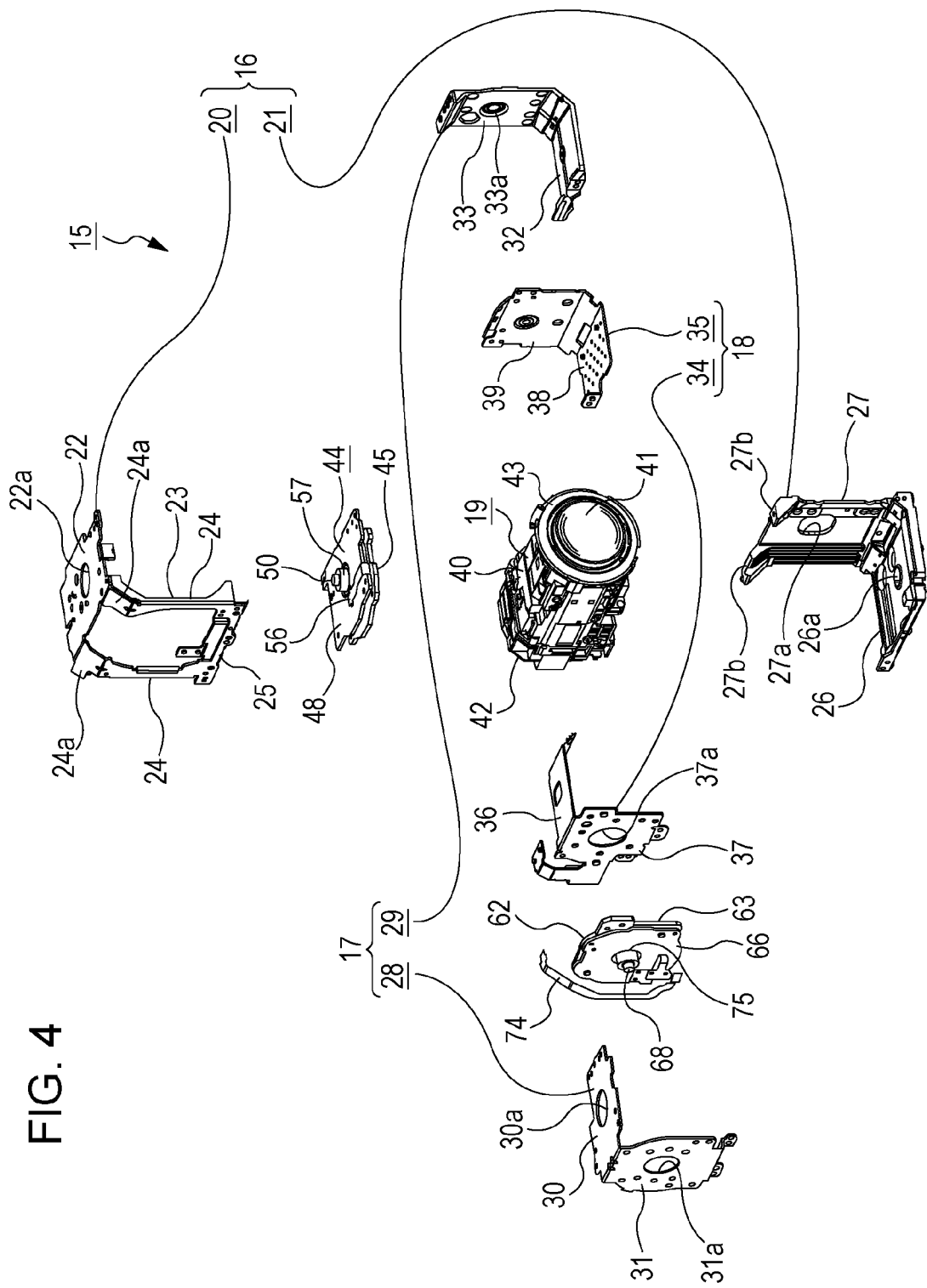
FIG. 4 is an exploded perspective view of the image blur correction device.
Figure 6:
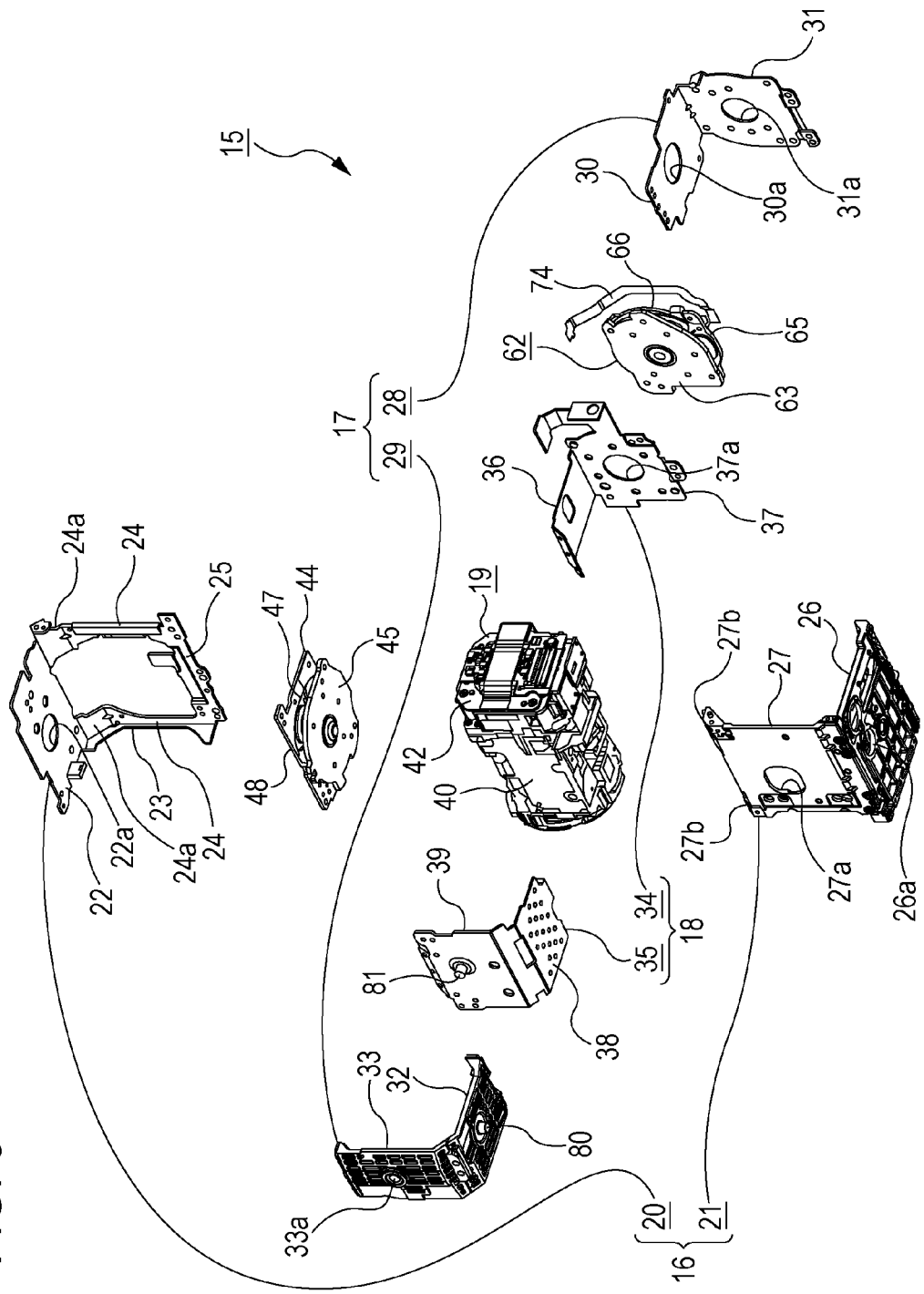
FIG. 6 is an exploded perspective view of the image blur correction device shown in a state of being viewed from a different direction to FIG. 4.
Figure 7:
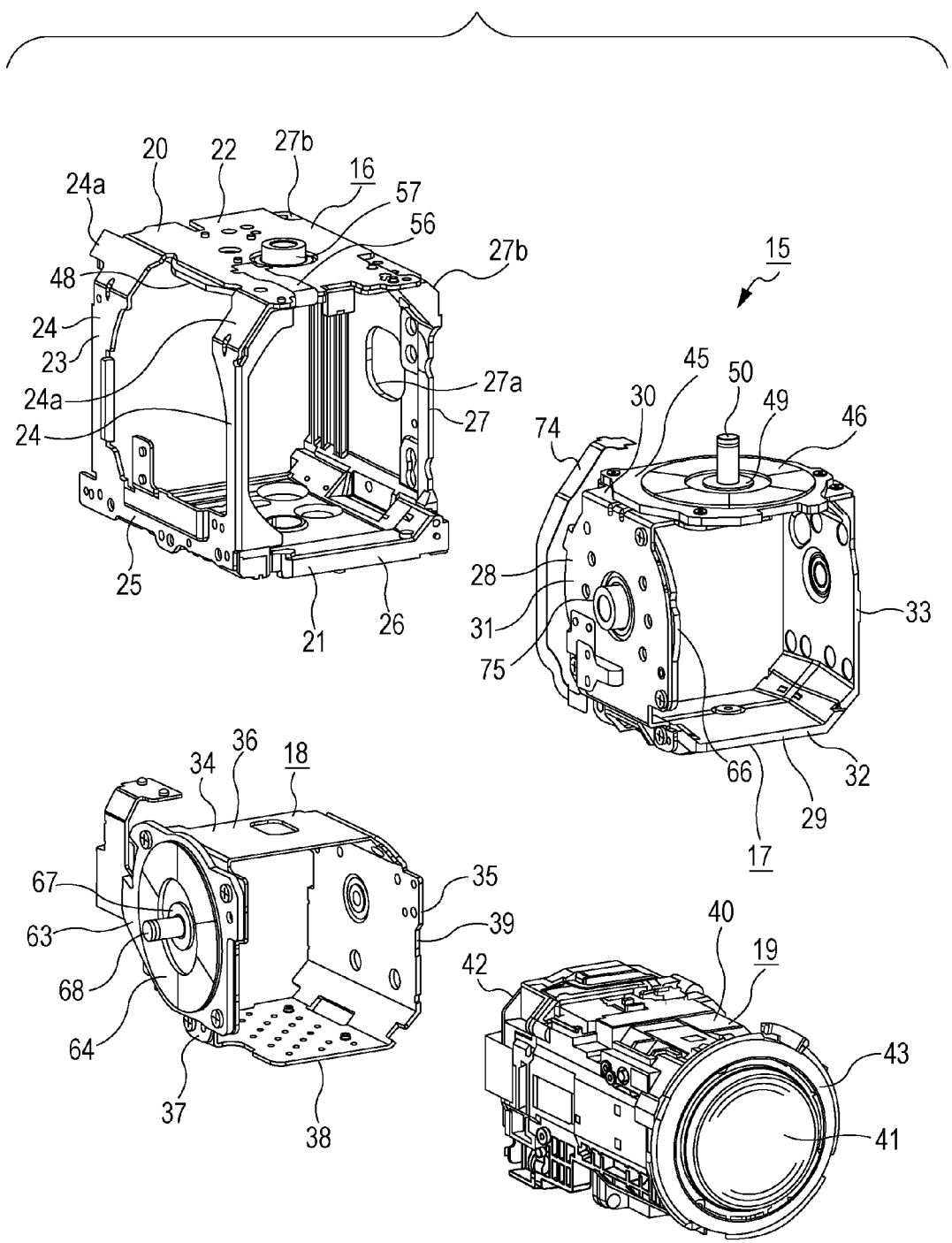
FIG. 7 is a perspective view of the image blur correction device shown separated into an outer frame, an inner frame, a holding frame and a lens unit.
Figure 8:
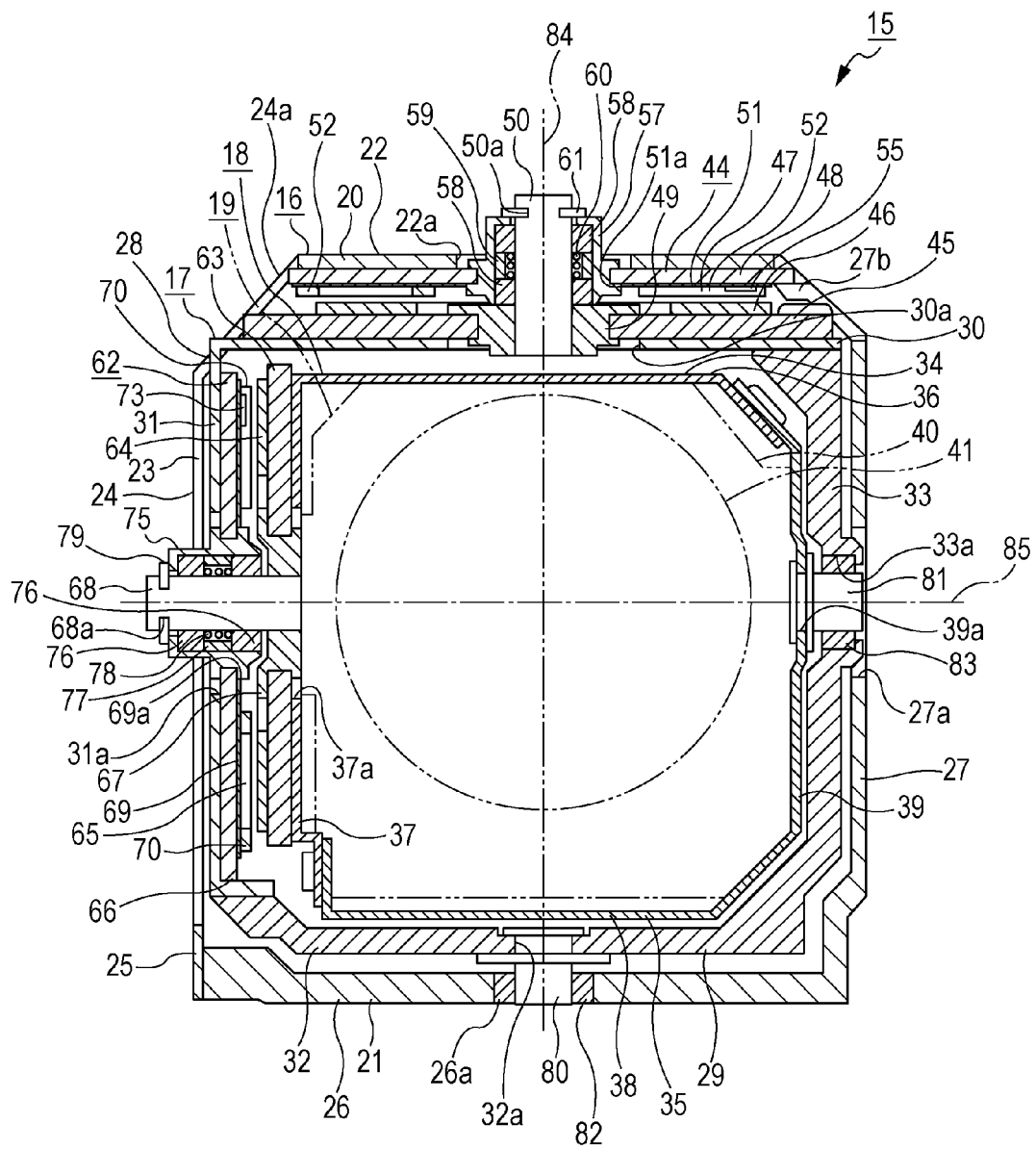
FIG. 8 is an outline expanded sectional view of the image blur correction device.

A first driving motor 44 is placed above the lens unit 19 (refer to FIGS. 4, 6 and 8).

Figure 9:
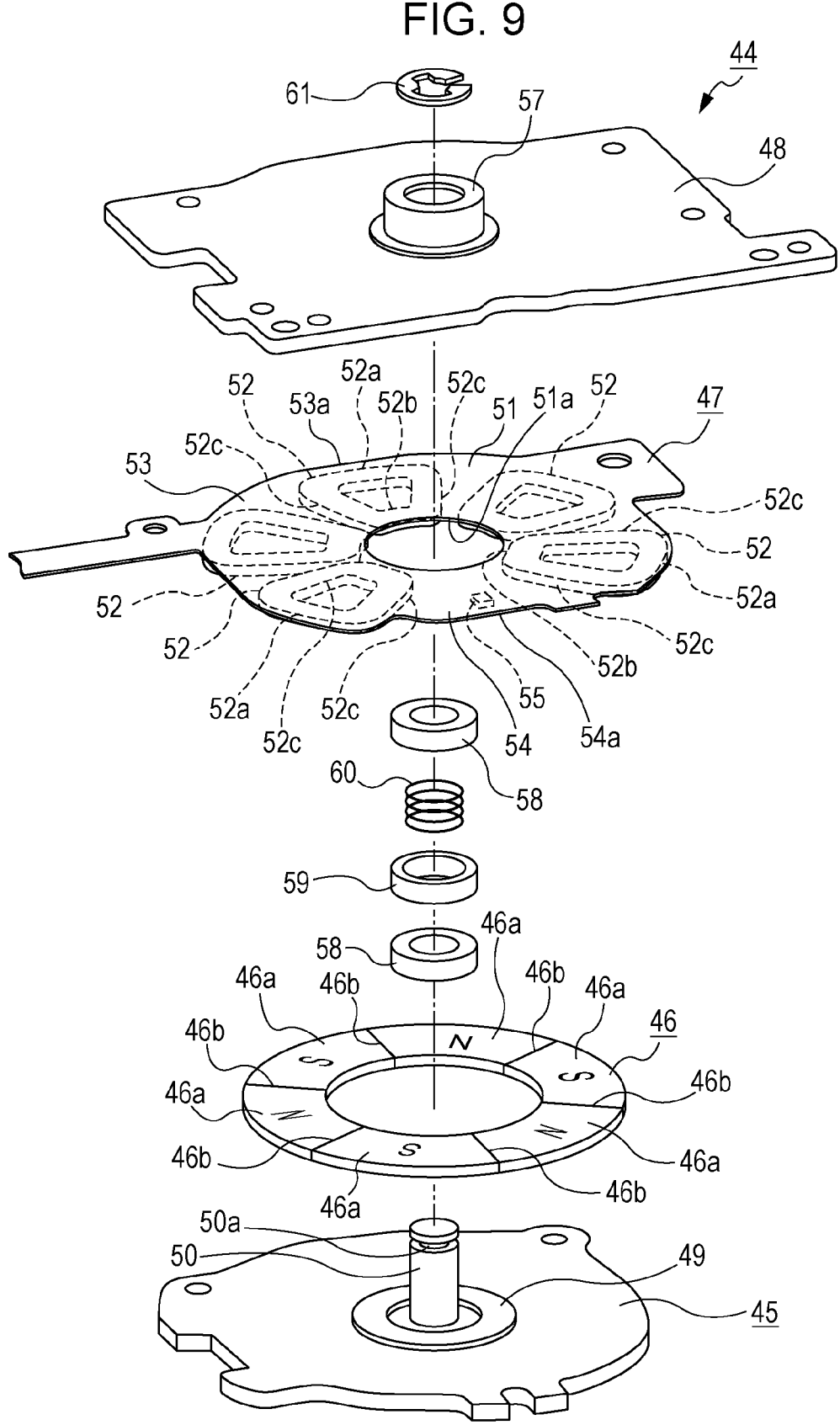
FIG. 9 is an expanded exploded perspective view of a first driving motor.
Figure 10:
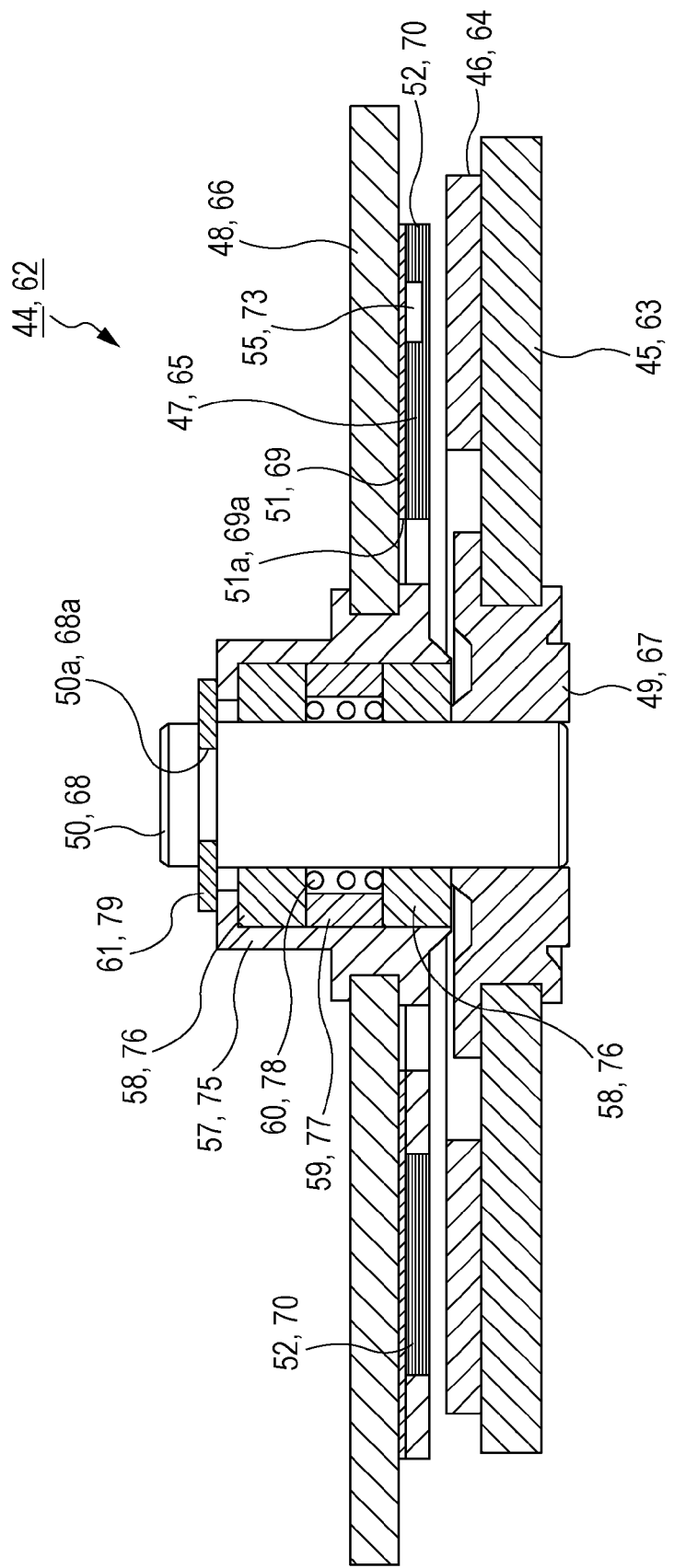
FIG. 10 is an expanded sectional view of a driving motor.

The first driving motor 44 is, for example, a flat motor, is made thin in the vertical direction and includes a fixing plate 45, a magnet 46, a coil body 47 and a target fixing plate 48 (refer to FIGS. 8 to 10).

The fixing plate 45 faces the vertical direction, and a shaft securing member 49 is fixed to the substantially central portion of the fixing plate 45. The lower end portion of an output shaft 50 is fixed to the shaft securing member 49, and a portion other than the lower end portion of the output shaft 50 protrudes upward from the fixing plate 45. A fitting groove 50a that extends in the circumferential direction is formed at a position near the upper end of the output shaft 50. The fixing plate 45 functions as a yoke.

The magnet 46 is formed in a circular ring shape, fixed to the upper surface of the fixing plate 45 and north and south magnetic poles 46a,46a, . . . are alternately magnetized side by side in the circumferential direction. The magnet 46 is, for example, magnetized with 6 poles at equal intervals of 60°, and the borders of the magnetic poles 46a,46a, . . . are formed as pole borders 46b,46b, . . . .

The coil body 47 includes a laminar base section 51 formed in a ring shape and a plurality of coil sections 52,52, . . . placed separated in the circumferential direction on the lower surface of the base section 51, and the coil sections 52,52, . . . are formed in one phase that is successively connected.

Figure 11:
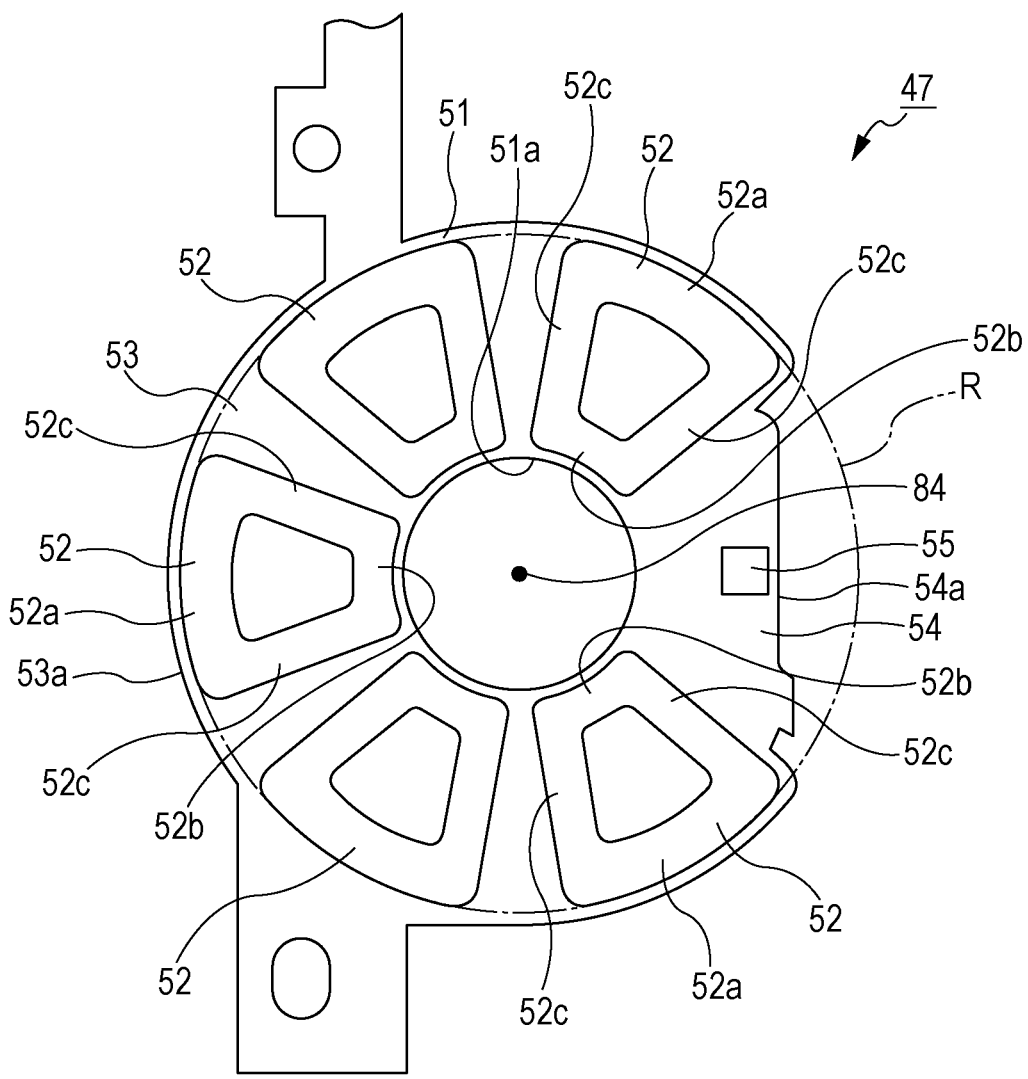
FIG. 11 is an expanded plan view of a coil body of the first driving motor.

A shaft insertion through hole 51a is formed in the central portion of the base section 51. A placement area 53, in which coil sections 52,52, . . . are placed and a non-placement area 54, in which coil sections 52,52, . . . , are not placed, are formed in the base sections 51. The base section 51 is formed with the placement area 53 as an area corresponding to an angle of approximately 300° in the circumferential direction and the remaining area corresponding to an angle of approximately 60° is formed as the non-placement area 54 (refer to FIGS. 9 and 11). The outer circumference 53a of the placement area 53 is formed in a substantially arc-like form and the outer circumference 54a of the non-placement area 54 is formed in a substantially linear form.

The coil sections 52,52, . . . are respectively provided in the placement area 53 with, for example, 5 coil sections 52, 52, . . . at 60° intervals, and are positioned separated at equal intervals in the circumferential direction. Each coil section 52 is formed of an outer circumferential section 52a that is formed in a gentle arc-like form, an inner circumferential section 52b that is positioned to the inside of the outer circumferential section 52a and formed in a gentle arc-like form and propulsion force generation sections 52c,52c that respectively link both end portions of the outer circumferential section 52a and both end portions of the inner circumferential section 52b.

The propulsion force generation sections 52c,52c, . . . are formed in a linear form that extends in an emission direction based on the center of the shaft insertion through hole 51a of the base section 51. The center of the shaft insertion through hole 51a of the base section 51 is consistent with the first pivot axis to be described later, which pivots the lens unit 19 in the yaw direction.

A Hall effect device, for example, is placed as a magnetic detection element 55 in the non-placement area 54 of the base section 51. The magnetic detection element 55 is placed in a position in which the distance from the coil sections 52,52 on both sides thereof is the same. In addition, the magnetic detection element 55 is placed to the inside of the outer circumference of the magnet 46 that it faces and is present in a position facing the magnet 46.

The outer circumference 54a of the non-placement area 54 is positioned to the inside of a virtual circle that links the outer circumferences of the coil sections 52,52, . . . (refer to FIG. 11).

An electric current is supplied from a current drive circuit, which is not shown in the drawings, to the coil sections 52, 52, . . . of the coil body 47 and the magnetic detection element 55 via a flexible printed wiring board 56, a portion of which is fixed to the base section 51.

The target fixing plate 48 faces the vertical direction and the upper surface of the base section 51 in the coil body 47 is fixed to the lower surface thereof (refer to FIGS. 8 to 10). A holding member 57 which is formed in a substantially cylindrical form is fixed to the substantially central portion of the target fixing plate 48, and a portion other than the lower end portion of the holding member 57 protrudes upward from the target fixing plate 48.

Circular ring-shaped first shaft bearings 58,58 and a spacer 59 are respectively inserted into the holding member 57 and are held in place. The first shaft bearings 58,58 are, for example, ball bearings (bearings) and are positioned surrounding the spacer 59 to the left and right. A compression spring 60 is placed inside the spacer 59, and the first shaft bearings 58,58 are biased in mutually separated directions in the vertical direction by the compression spring 60.

In a state where the first shaft bearings 58,58, the spacer 59 and the compression spring 60 are placed inserted into the holding member 57, the output shaft 50 is inserted through the first shaft bearings 58,58, the spacer 59 and the shaft insertion through hole 51a of the base section 51 from the bottom. The output shaft 50 rotatably supports the first shaft bearings 58,58 that are positioned separated in the axial direction.

The upper end portion of the output shaft 50 protrudes upward from the holding member 57, and a fastener 61 is fitted to the fitting groove 50a of the output shaft 50 to prevent the output shaft 50 from dropping out from the holding member 57, thereby configuring the first driving motor 44. In a state where the first driving motor 44 is configured, the coil sections 52,52, . . . of the coil body 47 and the magnet 46 are positioned to face each other above and below.

A second driving motor 62 is placed to the right of the lens unit 19 (refer to FIGS. 4, 6 and 8).

Figure 12:
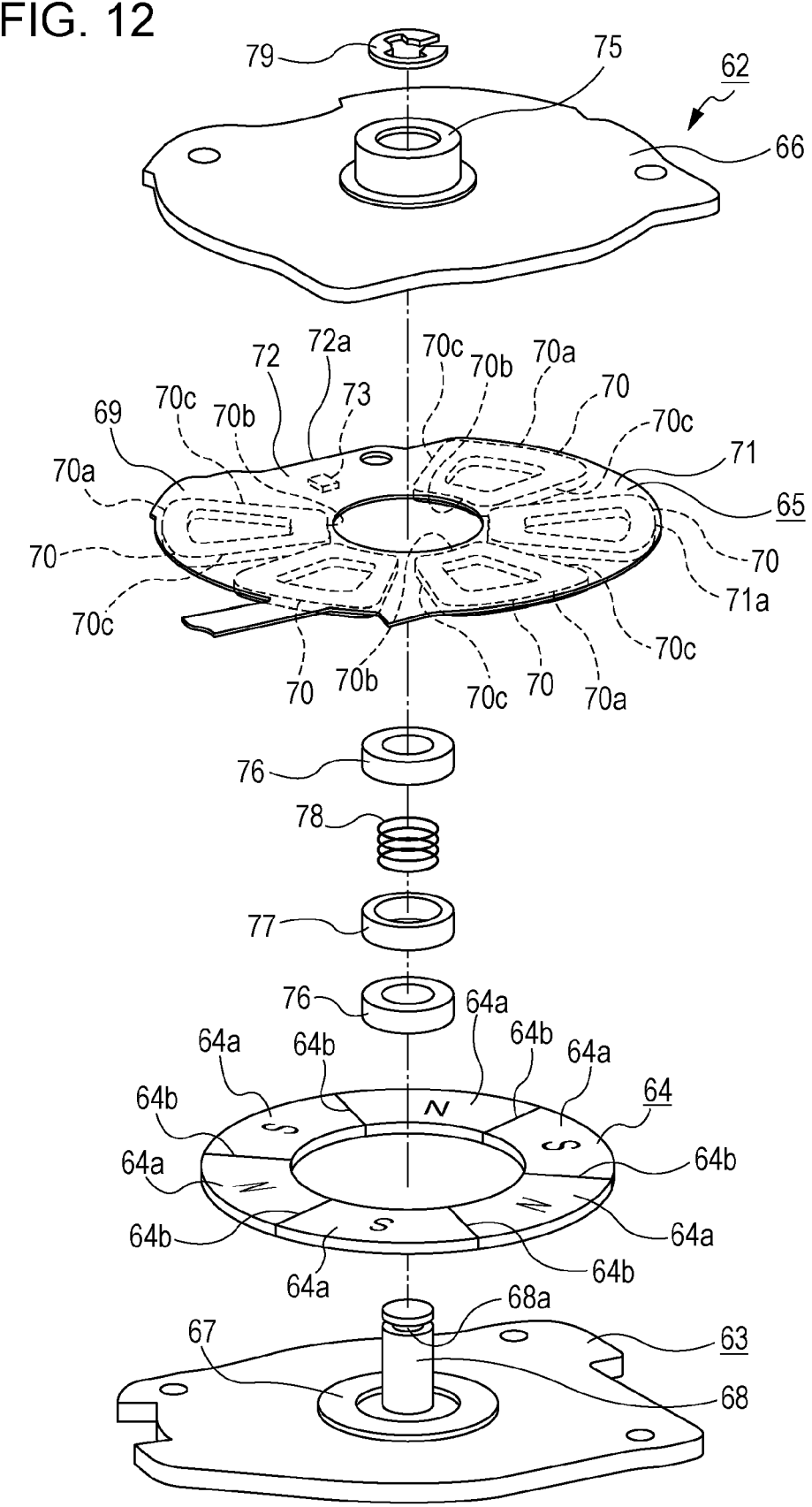
FIG. 12 is an expanded exploded perspective view of a second driving motor.

The second driving motor 62 is, for example, a flat motor, is made thin in the horizontal direction and includes a fixing plate 63, a magnet 64, a coil body 65 and a target fixing plate 66 (refer to FIGS. 8, 10 and 12).

The fixing plate 63 faces the horizontal direction, and a shaft securing member 67 is fixed to the substantially central portion of the fixing plate 63. The left end portion of an output shaft 68 is fixed to the shaft securing member 67, and a portion other than the left end portion of the output shaft 68 protrudes to the right from the fixing plate 63. A fitting groove 68a that extends in the circumferential direction is formed at a position near the left end of the output shaft 68. The fixing plate 63 functions as a yoke.

The magnet 64 is formed in a circular ring shape, fixed to the right surface of the fixing plate 63 and north and south magnetic poles 64a,64a, . . . are alternately magnetized side by side in the circumferential direction. The magnet 64 is, for example, magnetized with 6 poles at equal intervals of 60°, and the borders of the magnetic poles 64a, 64a, . . . are formed as pole borders 64b,64b, . . . .

The coil body 65 includes a laminar base section 69 formed in a ring shape and a plurality of coil sections 70,70, . . . placed separated in the circumferential direction on the left surface of the base section 69, and the coil sections 70,70, . . . are formed in one phase that is successively connected.

Figure 13:
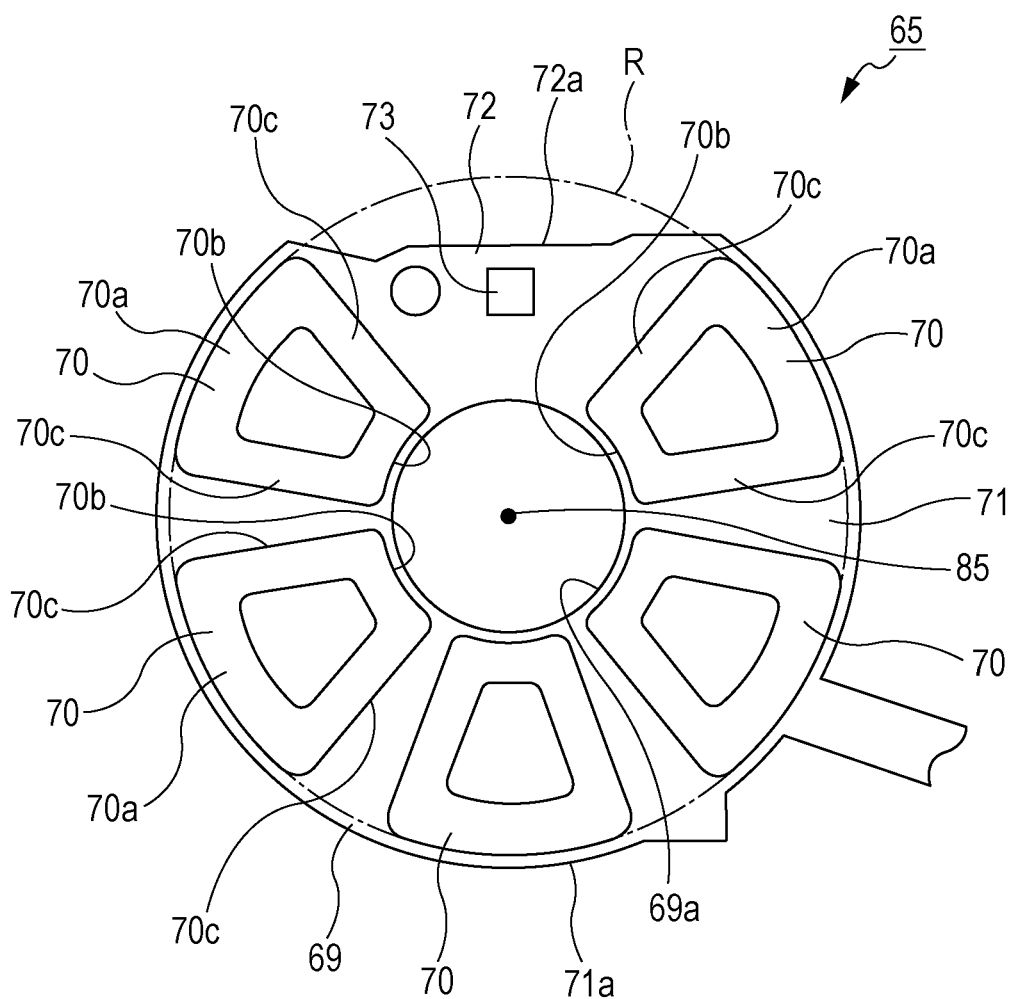
FIG. 13 is an expanded plan view of a coil body of the second driving motor.

A shaft insertion through hole 69a is formed in the central portion of the base section 69. A placement area 71, in which coil sections 70,70, . . . are placed and a non-placement area 72, in which coil sections 70,70, . . . , are not placed, are formed in the base sections 69. The base section 69 is formed with the placement area 71 as an area corresponding to an angle of approximately 300° in the circumferential direction and the remaining area corresponding to an angle of approximately 60° is formed as the non-placement area 72 (refer to FIGS. 12 and 13). The outer circumference 71a of the placement area 71 is formed in a substantially arc-like form and the outer circumference 72a of the non-placement area 72 is formed in a substantially linear form.

The coil sections 70,70, . . . are respectively provided in the placement area 71 with, for example, 5 coil sections 70, 70, . . . at 60° intervals, and are positioned separated at equal intervals in the circumferential direction. Each coil section 70 is formed of an outer circumferential section 70a that is formed in a gentle arc-like form, an inner circumferential section 70b that is positioned to the inside of the outer circumferential section 70a and formed in a gentle arc-like form and propulsion force generation sections 70c,70c that respectively link both end portions of the outer circumferential section 70a and both end portions of the inner circumferential section 70b.

The propulsion force generation sections 70c,70c, . . . are formed in a linear form that extends in an emission direction based on the center of the shaft insertion through hole 69a of the base section 69. The center of the shaft insertion through hole 69a of the base section 69 is consistent with the second pivot axis to be described later, which pivots the lens unit 19 in the pitch direction.

A Hall effect device, for example, is placed as a magnetic detection element 73 in the non-placement area 72 of the base section 69. The magnetic detection element 73 is placed in a position in which the distance from the coil sections 70,70 on both sides thereof, is the same. In addition, the magnetic detection element 73 is placed to the inside of the outer circumference of the magnet 64 that it faces and is present in a position facing the magnet 64.

The outer circumference 72a of the non-placement area 72 is positioned to the inside of a virtual circle that links the outer circumferences of the coil sections 70,70, . . . (refer to FIG. 13).

An electric current is supplied from a current drive circuit, which is not shown in the drawings, to the coil sections 70, 70, . . . of the coil body 65 and the magnetic detection element 73 via a flexible printed wiring board 74, a portion of which is fixed to the base section 69.

The target fixing plate 66 faces the horizontal direction and the right surface of the base section 69 in the coil body 65 is fixed to the left surface thereof (refer to FIGS. 8, 10 and 12). A holding member 75 which is formed in a substantially cylindrical form is fixed to the substantially central portion of the target fixing plate 66, and a portion other than the left end portion of the holding member 75 protrudes to the right from the target fixing plate 66.

Circular ring-shaped first shaft bearings 76,76 and a spacer 77 are respectively inserted into the holding member 75 and are held place. The first shaft bearings 76,76 are, for example, ball bearings (bearings) and are positioned surrounding the spacer 77 to the left and right. A compression spring 78 is placed inside the spacer 77, and the first shaft bearings 76,76 are biased in mutually separated directions in the horizontal direction by the compression spring 78.

In a state where the first shaft bearings 76,76, the spacer 77 and the compression spring 78 are placed inserted into the holding member 75, the output shaft 68 is inserted through the first shaft bearings 76,76, the spacer 77 and the shaft insertion through hole 69a of the base section 69 from the right. The output shaft 68 rotatably supports the first shaft bearings 76,76 that are positioned separated in the axial direction.

The right end portion of the output shaft 68 protrudes to the right from the holding member 75, and a fastener 79 is fitted to the fitting groove 68a of the output shaft 68 to prevent the output shaft 68 from dropping out from the holding member 75, thereby configuring the second driving motor 62. In a state where the second driving motor 62 is configured, the coil sections 70,70, ... of the coil body 65 and the magnet 64 are positioned to face each other to the right and left.

A counter shaft 80 is fixed to the fixing hole 32a of the bottom side section 32 in the inner frame 17 (refer to FIG. 8). The upper end portion of the counter shaft 80 is fixed to the fixing hole 32a and a portion other than the upper end portion thereof protrudes downward from the bottom side section 32.

A counter shaft 81 is fixed to the fixing hole 39a of the left side surface section 39 in the holding frame 18. The right end portion of the counter shaft 81 is fixed to the fixing hole 39a and a portion other than the right end portion thereof protrudes to the left from the left side surface section 39.

A second shaft bearing 82 is fixed to the placement hole 26a of the first planar section 26 in the outer frame 16 in an inserted state. A ball bearing (bearing), for example, can be used as the second shaft bearing 82.

A second shaft bearing 83 is fixed to the placement hole 33a of the left side section 33 in the inner frame 17 in an inserted state. A ball bearing (bearing), for example, can be used as the second shaft bearing 83.

Configuration of the Fixing of Each Part

Figure 14:
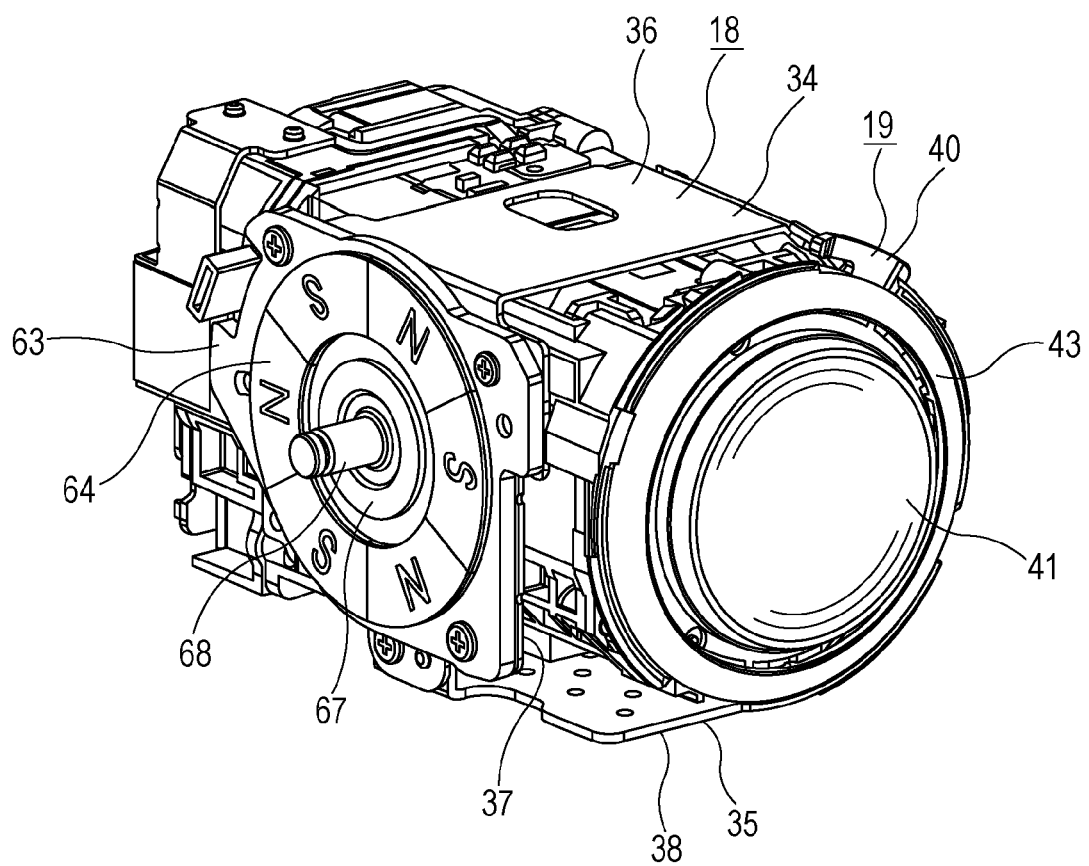
FIG. 14 is a perspective view of the image blur correction device shown in a state where a part of the second driving motor mounted to the inner frame, inner frame, and outer frame have been removed.

The holding frame 18 is fixed to the outer circumferential surface of the lens unit 19 by a fastening screw or the like (refer to FIGS. 8 and 14). In a state where the holding frame 18 is fixed to the lens unit 19, both the front and back end portions of the lens unit 19 protrude into the front and back of the holding frame 18.

The fixing plate 63 of the second driving motor 62 is fixed to the outer surface of the right side surface section 37 in the holding frame 18 by a fastening screw or the like, and the second driving motor 62 is placed to the right of the holding frame 18.

Figure 15:
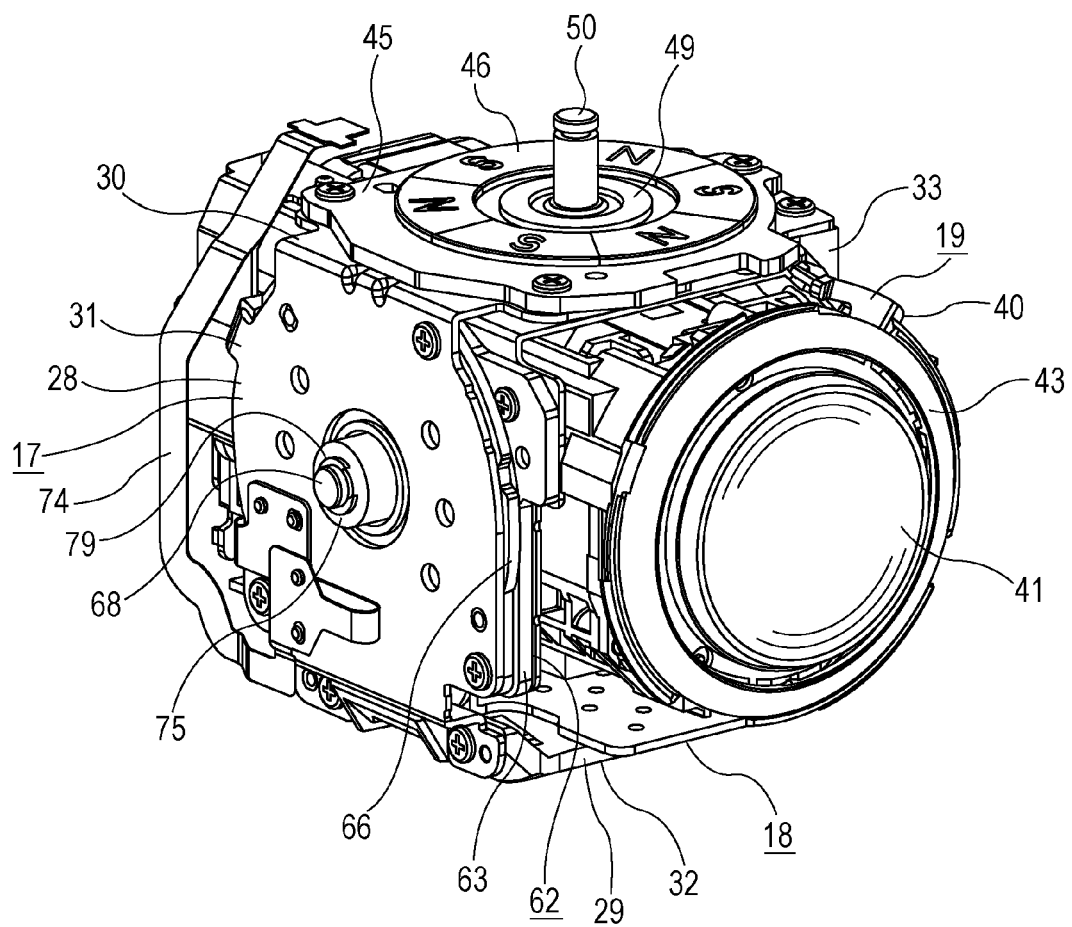
FIG. 15 is a perspective view of the image blur correction device shown in a state where a part of the first driving motor mounted to the outer frame and the outer frame have been removed.
Figure 16:
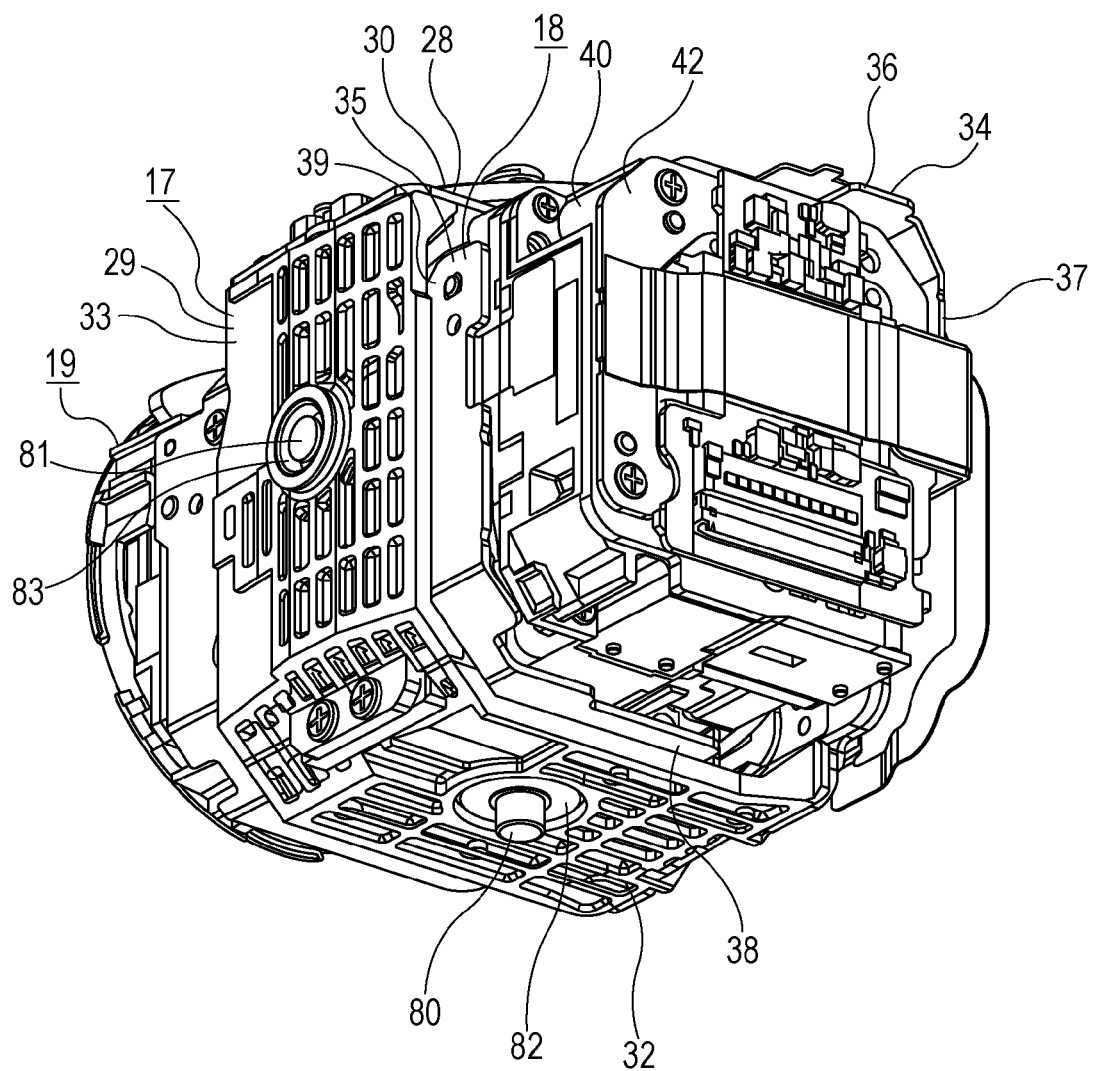
FIG. 16 is a perspective view of the image blur correction device shown in a state of being viewed from a different angle to FIG. 15 where the part of the first driving motor mounted to the outer frame and the outer frame have been removed.
Figure 17:
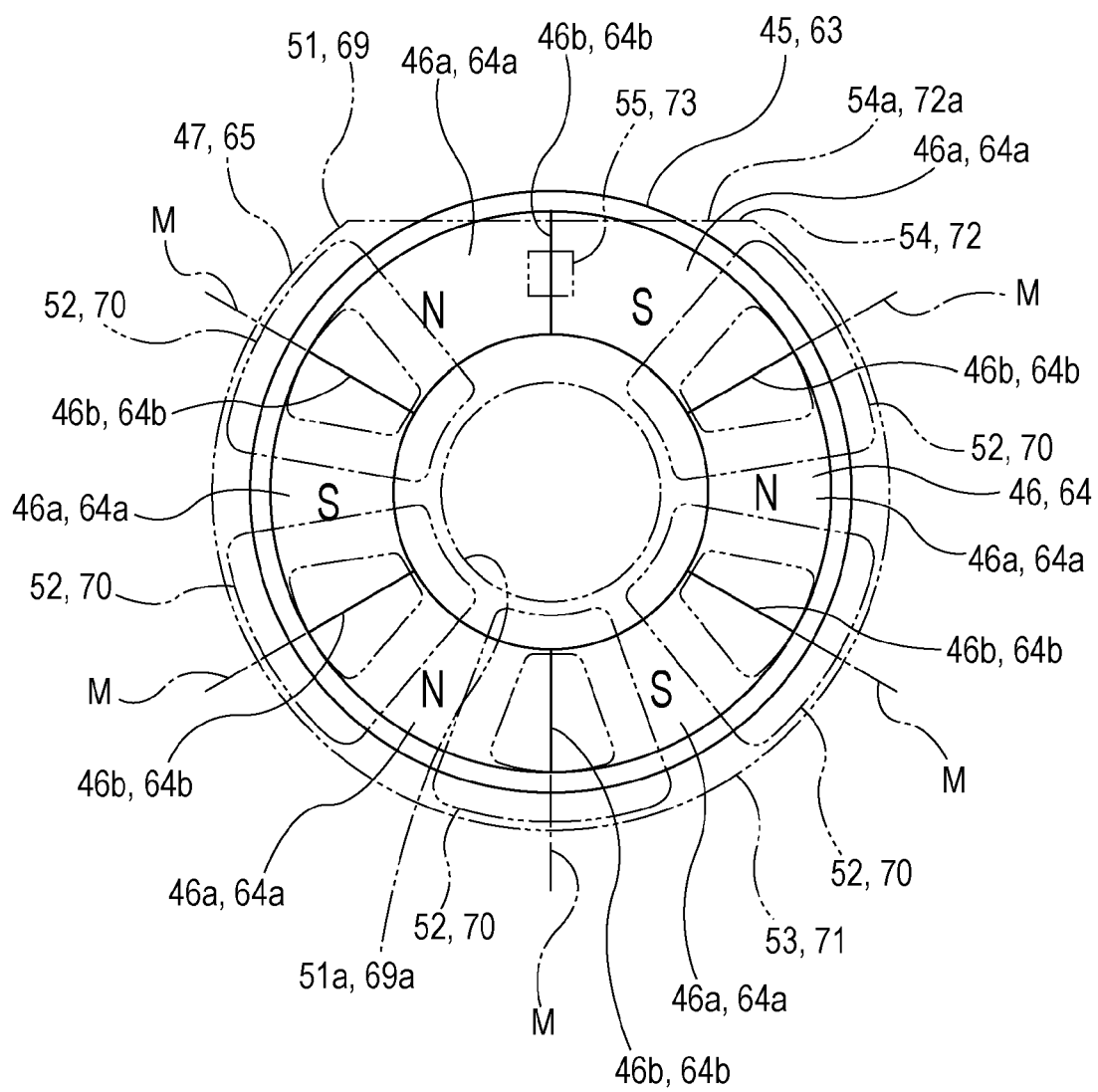
FIG. 17 is a schematic view showing the positional relationship between a magnet and a coil body at a reference position.
Figure 18:
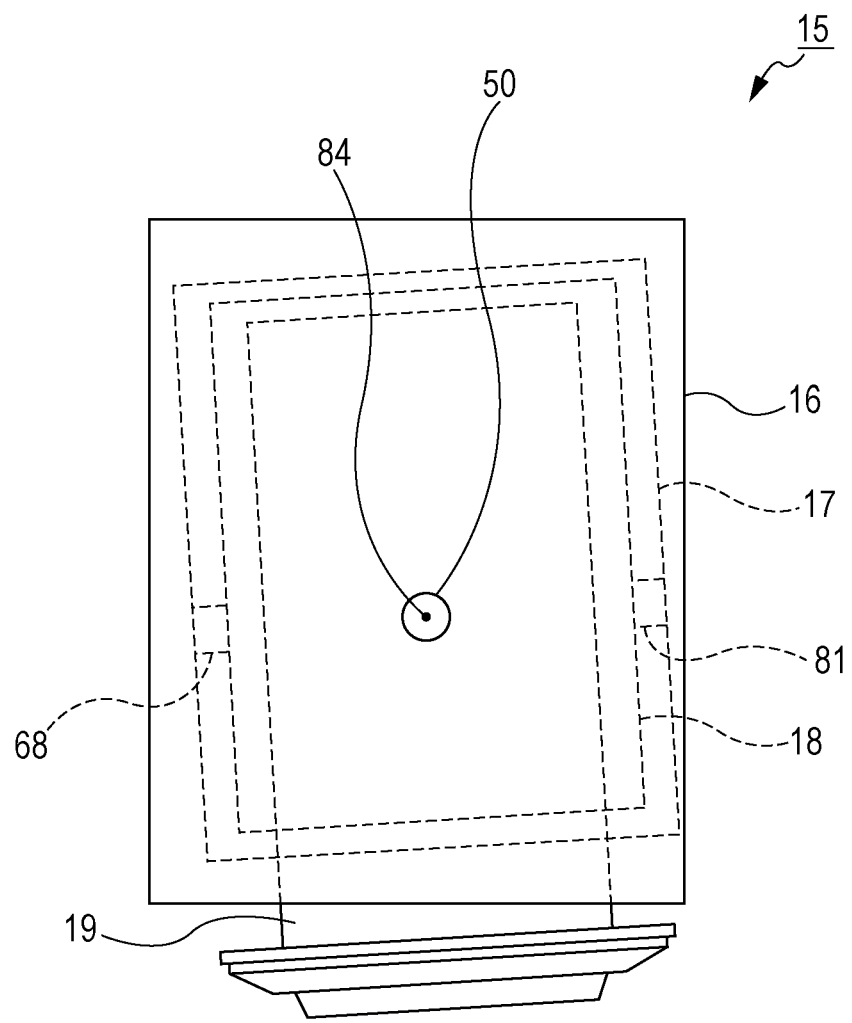
FIG. 18 is an outline plan view showing a pivoted state in one direction in the yaw direction and together with FIG. 19 shows pivoted states in which the lens unit is pivoted in the yaw direction.
Figure 19:
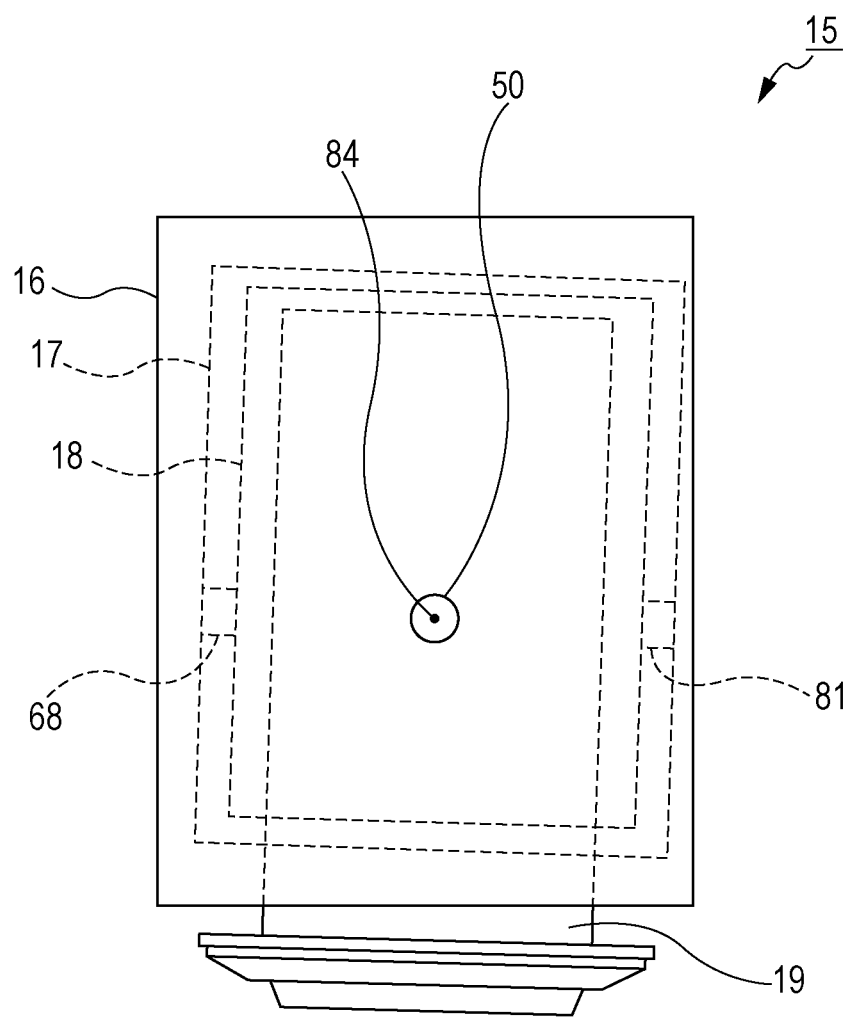
FIG. 19 is an outline plan view showing a pivoted state in the other direction in the yaw direction.
Figure 20:
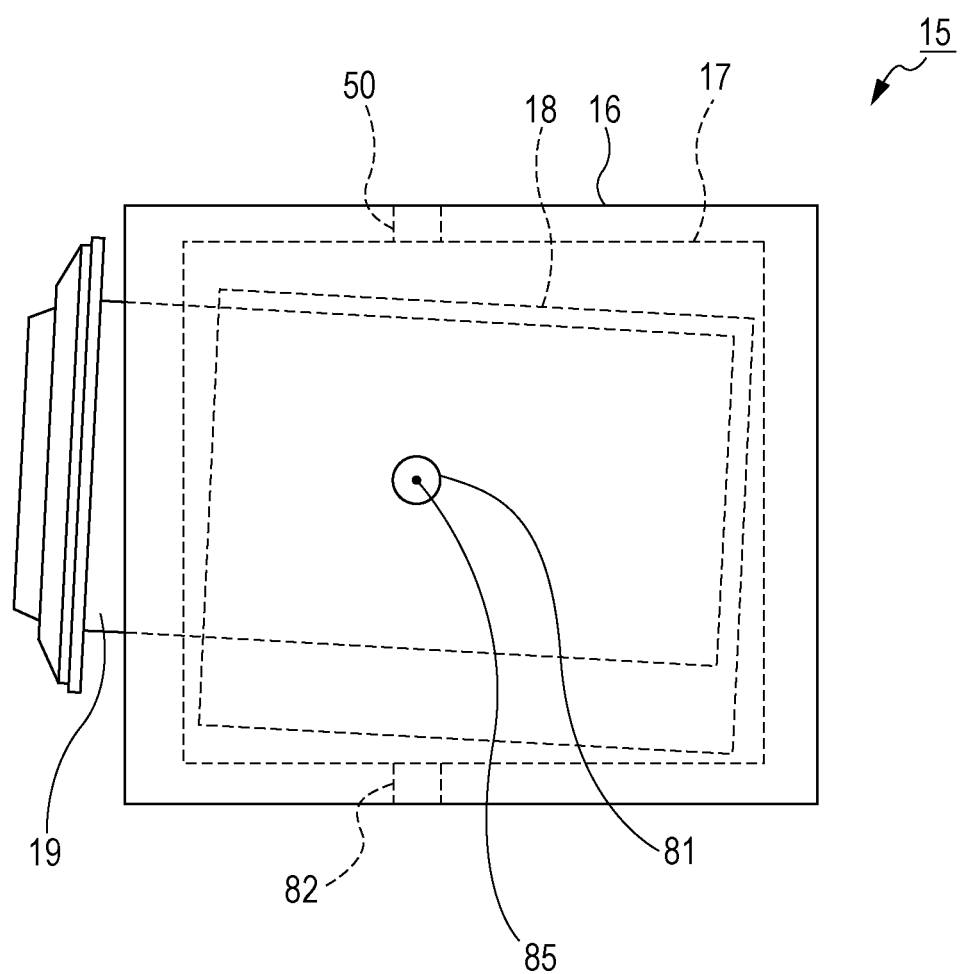
FIG. 20 is an outline plan view showing a pivoted state in one direction in the pitch direction and together with FIG. 21 shows pivoted states in which the lens unit is pivoted in the pitch direction.
Figure 21:
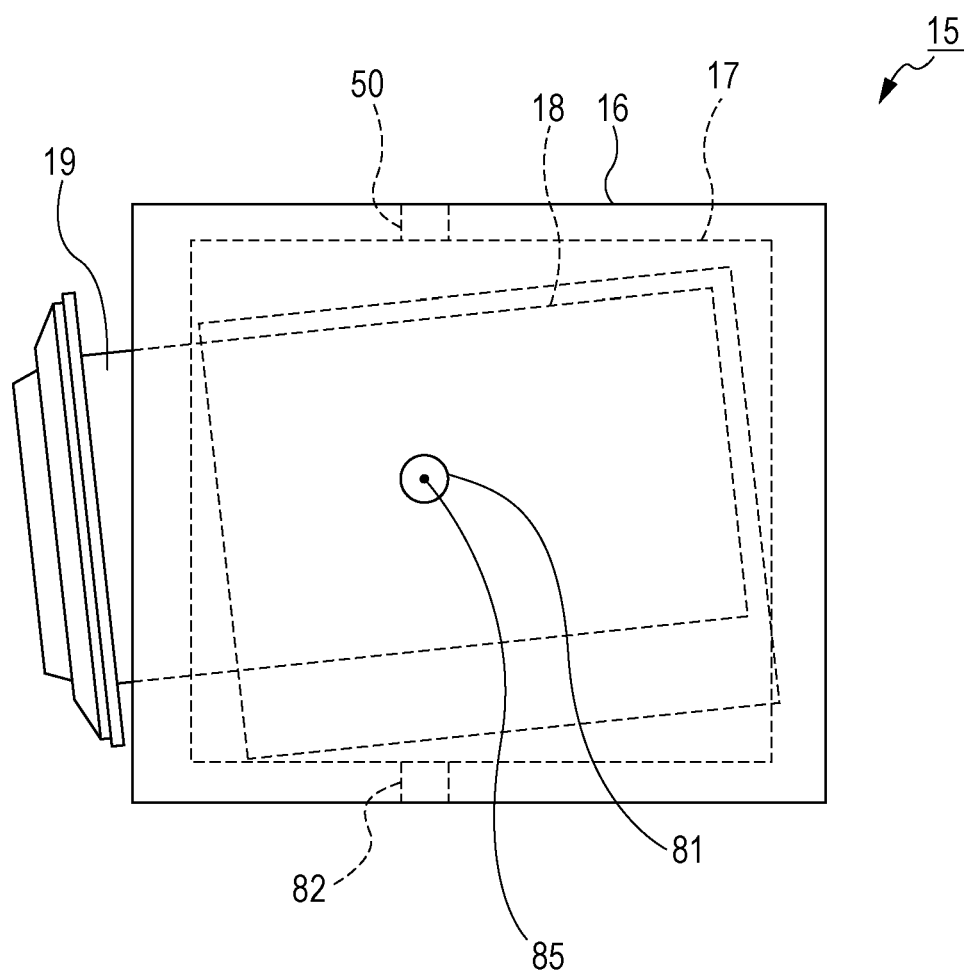
FIG. 21 is an outline plan view showing a pivoted state in the other direction in the pitch direction.

The inner frame 17 is placed on the outer circumferential side of the holding frame 18 (refer to FIGS. 8, 15 and 16). In a state where the inner frame 17 is placed on the outer circumferential side of the holding frame 18, the counter shaft 81 fixed to the left side surface section 39 of the holding frame 18 is rotatably supported by the second shaft bearing 83 fixed to the left side section 33 of the inner frame 17.

The target fixing plate 66 of the second driving motor 62 is fixed to the inner surface of the right side section 31 in the inner frame 17 by a fastening screw or the like. At this time, in the base section 69 of the coil body 65, the outer circumference 72a of the non-placement area 72 is configured in a state where it is positioned at the upper end. Accordingly, the non-placement area 72 is positioned in a direction that is orthogonal to the optical axis of the lens unit 19 and orthogonal to the axial direction of the output shaft 68 (a direction orthogonal to a second pivot axis to be described later), and is positioned in the upper right corner of the outer frame 16.

In this manner, by positioning the non-placement area 72, the outer circumference 72a of which is positioned to the inside of a virtual circle that links the outer circumferences of the coil sections 70,70, ..., in a corner in the outer frame 16, it is possible to achieve miniaturization of the image blur correction device 15 since, for example, it is possible to incline the corner of the outer frame 16 and reduce the size thereof.

Additionally, an example in which the outer circumference 72a of the non-placement area 72 is positioned at the upper end and the non-placement area 72 is positioned in the upper right corner of the outer frame 16 is indicated, but the outer circumference 72a of the non-placement area 72 may be positioned at the lower end and the non-placement area 72 may be positioned in the lower right corner of the outer frame 16.

The holding member 75 of the second driving motor 62 is inserted into the insertion hole 31a formed in the right side section 31 of the inner frame 17 and protrudes to the right thereof. At this time, a portion of the shaft securing member 67 fixed to the fixing plate 63 is placed in the insertion placement hole 37a formed in the right side surface section 37 of the holding frame 18. Accordingly, the holding member 75 only protrudes to the right by a small amount and it is possible to achieve miniaturization of the image blur correction device 15.

The fixing plate 45 of the first driving motor 44 is fixed to the upper surface of the top side section 30 of the inner frame 17, and the first driving motor 44 is placed at the top of the inner frame 17.

Figure 3:
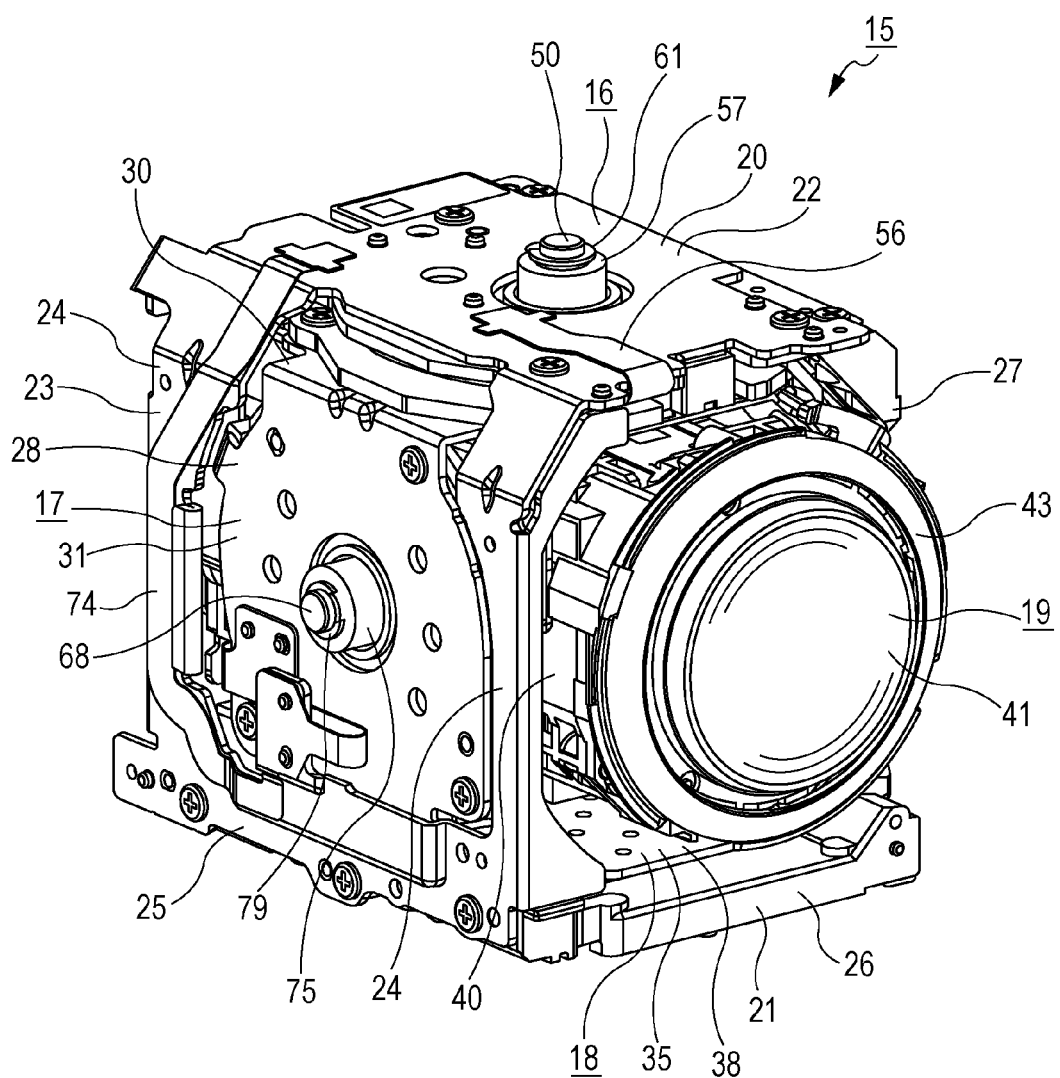
FIG. 3 is a perspective view showing an image blur correction device.
Figure 5:
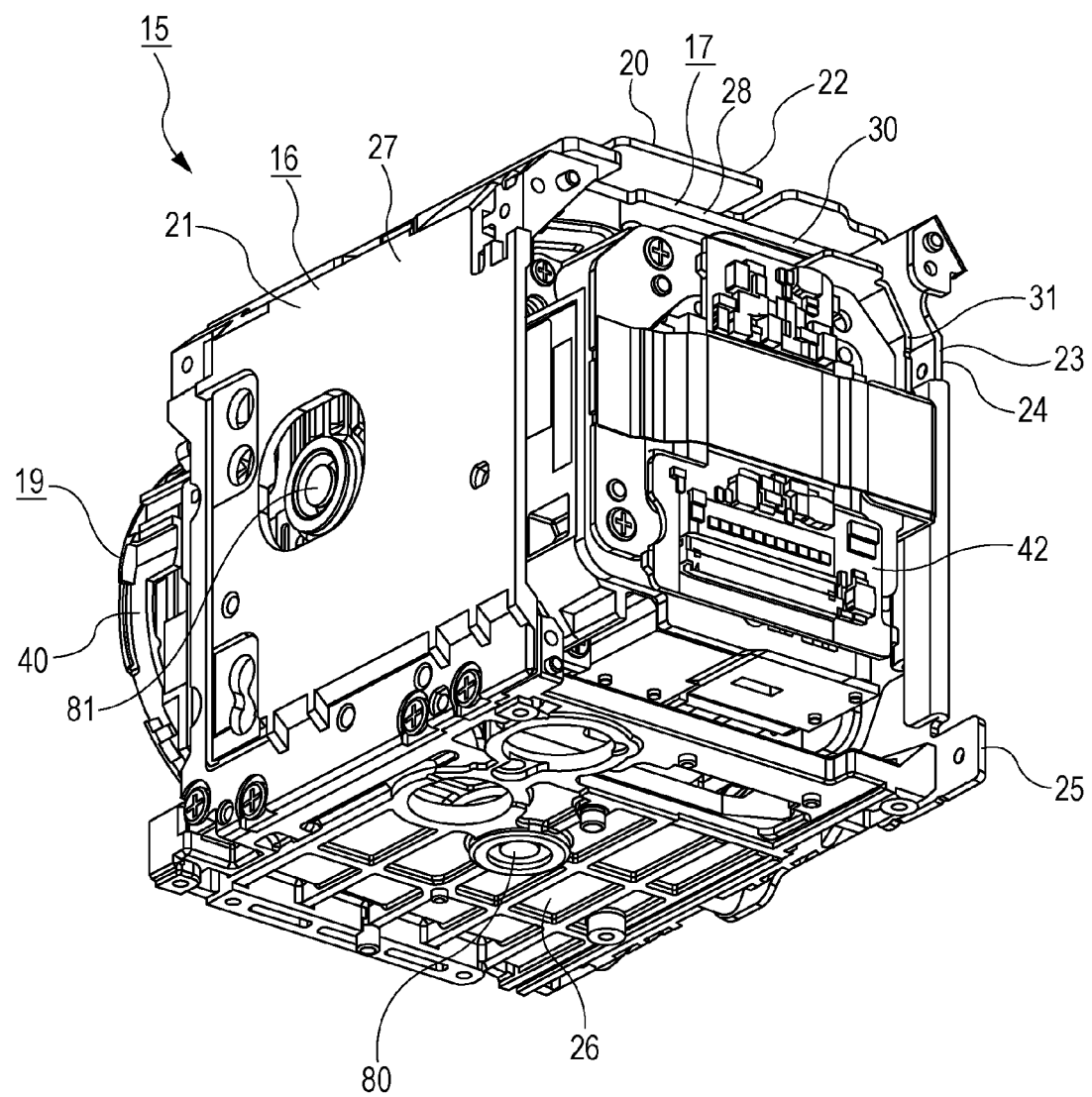
FIG. 5 is a perspective view of the image blur correction device shown in a state of being viewed from a different direction to FIG. 3.

The outer frame 16 is placed on the outer circumferential side of the inner frame 17 (refer to FIGS. 3, 5 and 8). At this time, the right end portion of the holding member 75 in the second driving motor 62 protrudes to the right from the second surface section 23 of the outer frame 16.

In a state where the outer frame 16 is placed on the outer circumferential side of the inner frame 17, the counter shaft 80 fixed to the bottom side section 32 of the inner frame 17 is rotatably supported by the second shaft bearing 82 fixed to the first planar section 26 of the outer frame 16.

The target fixing plate 48 of the first driving motor 44 is fixed to the lower surface of the first surface section 22 in the outer frame 16 by a fastening screw or the like. At this time, in the base section 51 of the coil body 47, the outer circumference 54a of the non-placement area 54 is configured in a state where it is positioned at the left end. Accordingly, the non-placement area 54 is positioned in a direction that is orthogonal to the optical axis of the lens unit 19 and orthogonal to the axial direction of the output shaft 50 (a direction orthogonal to a first pivot axis to be described later), and is positioned in the upper left corner of the outer frame 16.

In this manner, by positioning the non-placement area 54, the outer circumference 54a of which is positioned to the inside of a virtual circle R that links the outer circumferences of the coil sections 52,52, ..., in a corner in the outer frame 16, it is possible to achieve miniaturization of the image blur correction device 15 since, for example, it is possible to incline the corner of the outer frame 16 and reduce the size thereof.

Additionally, an example in which the outer circumference 54a of the non-placement area 54 is positioned at the left end and the non-placement area 54 is positioned in the upper left corner of the outer frame 16 is indicated above, but the outer circumference 54a of the non-placement area 54 may be positioned at the right end and the non-placement area 54 may be positioned in the upper right corner of the outer frame 16.

The left end portion of the target fixing plate 48 is fixed to the inclined sections 27b,27b of the second planar section 27 in the outer frame 16 by a fastening screw or the like. Accordingly, the first surface section 22 and the second planar section 27 of the outer frame 16 surround and join the target fixing plate 48 of the first driving motor 44.

The holding member 57 of the first driving motor 44 is inserted into the insertion through hole 22a formed in the first surface section 22 of the outer frame 16 and protrudes upward therefrom. At this time, a portion of the shaft securing member 49 fixed to the fixing plate 45 is placed in the insertion placement hole 30a formed in the top side section 30 of the inner frame 17. Accordingly, the holding member 57 only protrudes upward by a small amount and it is possible to achieve miniaturization of the image blur correction device 15.

In addition, the counter shaft 81 is placed in the insertion placement hole 27a of the second planar section 27 in the outer frame 16, and it is possible to achieve further miniaturization of the image blur correction device 15 since the counter shaft 81 does not protrude to the left from the second planar section 27.

In the image blur correction device 15 configured as described above, an axis that links the central axis of the output shaft 50 of the first driving motor 44 and the central axis of the counter shaft 80 is set as the first pivot axis 84 and an axis that links the central axis of the output shaft 68 of the second driving motor 62 and the central axis of the counter shaft 81 is set as the second pivot axis 85 (refer to FIG. 8).

Action of Image Blur Correction Device

Hereinafter, the blur correction action of the image blur correction device 15 will be described (refer to FIGS. 17 to 21).

The lens unit 19 is pivoted in the yaw direction (a first direction) and the pitch direction (a second direction) with the first pivot axis 84 and the second pivot axis 85 as the respective pivot points thereof.

In a state in which the lens unit 19 is in a reference position before being pivoted in the yaw direction, that is, a position in the center of the pivot range in the yaw direction, the pole borders 46b,46b, . . . of the magnet 46 of the first driving motor 44 are respectively consistent with central lines M, M, . . . in the circumferential direction of the coil sections 52,52, . . . (refer to FIG. 17). In addition, at this time, one pole border 46b of the magnet 46 is consistent with the center of the magnetic detection element 55 provided in the coil body 47.

Meanwhile, in a state in which the lens unit 19 is in a reference position before being pivoted in the pitch direction, that is, a position in the center of the pivot range in the pitch direction, the pole borders 64b,64b, . . . of the magnet 64 of the second driving motor 62 are respectively consistent with central lines M,M, . . . in the circumferential direction of the coil sections 70,70, . . . (refer to FIG. 17). In addition, at this time, one pole border 64b of the magnet 64 is consistent with the center of the magnetic detection element 73 provided in the coil body 65.

Pivoting of the lens unit 19 in the yaw direction is performed by applying an electric current to the coil sections 52,52, . . . so that a propulsion force in the direction to correct blur is generated in the propulsion force generation sections 52c,52c. At this time, according to the rotation of the fixing plate 45, the magnet 46 and the output shaft 50, the lens unit 19 is pivoted integrally with the inner frame 17 and the holding frame 18 with respect to the outer frame 16, with the first pivot axis 84 as a pivot point (refer to FIGS. 18 and 19).

Detection of the rotation position of the magnet 64 is performed by the magnetic detection element 55 at the time of pivoting of the lens unit 19 in the yaw direction. Detection of the rotation position of the magnet 64 is performed by a change in the magnetic flux that accompanies rotation of the magnet 64 being detected by the magnetic detection element 55, and the pivot position of the lens unit 19 in the yaw direction is detected on the basis of the detection result of the rotation position of the magnet 64. Depending on the detection result of the rotation position of the magnet 64, as described above, an electric current is applied to the coil sections 52,52, . . . so that a propulsion force in the direction to correct blur is generated in the propulsion force generation sections 52c,52c.

Meanwhile, pivoting of the lens unit 19 in the pitch direction is performed by applying an electric current to the coil sections 70,70, . . . so that a propulsion force in the direction to correct blur is generated in the propulsion force generation sections 70c,70c. At this time, according to the rotation of the fixing plate 63, the magnet 64 and the output shaft 68, the lens unit 19 is pivoted integrally with the holding frame 18 with respect to the outer frame 16 and the inner frame 17, with the second pivot axis 85 as a pivot point (refer to FIGS. 20 and 21).

Detection of the rotation position of the magnet 64 is performed by the magnetic detection element 73 at the time of pivoting of the lens unit 19 in the pitch direction. Detection of the rotation position of the magnet 64 is performed by a change in the magnetic flux that accompanies rotation of the magnet 64 being detected by the magnetic detection element 73, and the pivot position of the lens unit 19 in the yaw direction is detected on the basis of the detection result of the rotation position of the magnet 64. Depending on the detection result of the rotation position of the magnet 64, as described above, an electric current is applied to the coil sections 70,70, . . . so that a propulsion force in the direction to correct blur is generated in the propulsion force generation sections 70c,70c.

Additionally, an example in which the lens unit 19 is pivotally supported by the inner frame 17 with the second pivot axis 85 as a pivot point thereof, and the lens unit 19 and the inner frame 17 are is pivotally supported integrally by the outer frame 16 with the first pivot axis 84 as a pivot point thereof is indicated above.

However, in the image blur correction device 15, conversely the lens unit 19 may be pivotally supported by the inner frame 17 with the first pivot axis 84 as a pivot point thereof, and the lens unit 19 and the inner frame 17 are pivotally supported integrally by the outer frame 16 with the second pivot axis 85 as a pivot point thereof.

Embodiment of Imaging Apparatus

A block diagram of a video camera according to an embodiment of the imaging apparatus according to an embodiment of the present technology is shown in FIG. 22.

An imaging apparatus (video camera) 100 (corresponding to the imaging apparatus 1) includes a lens unit 101 (corresponding to the lens unit 19) that has an imaging function, camera signal processing section 102 that performs signal processes such as analog-digital conversion of a captured image signal and an image processing section 103 that performs record and reproduction processes of an image signal. In addition, imaging apparatus 100 is provided with an image display section 104 (corresponding to the display section 13) such as a liquid crystal panel that displays a captured image, or the like, a reader/writer (R/W) 105 that performs writing and reading of an image signal to and from a memory card 1000 (corresponding to the memory card 9), a Central Processing Unit (CPU) 106 that controls the entire imaging apparatus 100, an input section 107 (corresponding to the operation switch 7, the operation button 8, the operation button 10 and the operation section 17) which is formed of various types of switches, or the like through which a user performs desired actions and a lens driving control section 108 which controls the driving of the lenses placed in the lens unit 101.

The lens unit 101 is configured by an imaging element 110 (corresponding to the imaging element provided in the imaging unit 42), or the like, such as an optical system, a CCD (Charge Coupled Device) or a CMOS (Complementary Metal-Oxide Semiconductor) that includes a lens group 109 (corresponding to the lens group provided in the lens unit 19).

The camera signal processing section 102 performs various signal processes such as conversion into a digital signal, noise removal, image quality correction, and conversion into a brightness signal and a color-difference signal on the output signal from the imaging element 110.

The image processing section 103 performs compression encoding and expansion decoding of an image signal and a data specification conversion process, or the like, of resolution, or the like on the basis of predetermined image data formats.

The image display section 104 has a function of displaying the state of an operation of the input section 107 by a user and the various types of data of a captured image, or the like.

The R/W 105 writes image data encoded by the image processing section 103 to the memory card 1000 and reads image data stored on the memory card 1000.

The CPU 106 functions as a control processing section that controls each circuit block provided in the imaging apparatus 100 and controls each circuit block on the basis of instruction signals, or the like, from the input section 107.

The input section 107 is configured by, for example, a shutter release button for a shutter operation and a selection switch for selecting a mode of operation and the like, and outputs an instruction signal to the CPU 106 depending on the operation of a user.

The lens driving control section 108 controls a motor, or the like, which is not shown in the drawings, that drives each lens of the lens group 109 on the basis of a control signal from the CPU 106.

The memory card 1000 is, for example, semiconductor memory that is removable from a slot that is connected to the R/W 105.

Hereinafter, the operation in the imaging apparatus 100 will be described.

In an image capture standby state, under the control of the CPU 106, an image signal captured in the lens unit 101 is output to the image display section 104 and displayed as a camera through-the-lens image via the camera signal processing section 102. In addition, when an instruction signal to perform zooming is input from the input section 107, the CPU 106 outputs a control signal to the lens driving control section 108, and under the control of the lens driving control section 108, a predetermined lens of the lens group 109 is moved.

When a shutter, which is not shown in the drawings, of the lens unit 101 is moved according to an instruction signal from the input section 107, a captured image signal is output from the camera signal processing section 102 to the image processing section 103, compression encoded and converted into digital data of a predetermined data format. The converted data is output to the R/W 105 and written to the memory card 1000.

Focusing and zooming are performed by the lens driving control section 108 moving a predetermined lens of the lens group 109 on the basis of a control signal from the CPU 106.

In a case of reproducing image data stored on the memory card 1000, according to an operation of the input section 107, predetermined image data is read from the memory card 1000 using the R/W 105, and after expansion decoding has been performed by the image processing section 103, a reproduction image signal is output to the image display section 104 and a reproduction image is displayed.

Overview

As described above, in the imaging apparatus 1, the placement areas 53, 71 in which the plurality of coil sections 52, 52, . . . , 70, 70, . . . are placed and the non-placement areas 54, 72 which are positioned between both ends in the circumferential directions of the placement areas 53, 71 and in which there are no coil sections 52, 52, . . . , 70, 70, . . . , are formed in the base sections 51, 69 of the first driving motor 44 and the second driving motor 62, and the outer circumferences 54a, 72a of the non-placement areas 54, 72 are positioned to the inside of virtual circles R that link the outer circumferences of each coil section 52, 52, . . . , 70, 70, . . . .

Accordingly, the sizes of the base sections 51, 69 are reduced and it is possible to achieve miniaturization of the image blur correction device 15 and the imaging apparatus 1 in a configuration in which the lens unit 19 is pivoted in the revolving direction of the first pivot axis 84 and the revolving direction of the second pivot axis 85.

In addition, magnetic detection elements 55, 73, which perform position detection in the pivot directions of the lens unit 19, are placed in the non-placement areas 54, 72 of the base sections 51, 69.

Accordingly, dedicated spaces for the magnetic detection elements 55, 73 are not necessary, and it is possible to achieve further miniaturization of the image blur correction device 15 and the imaging apparatus 1.

Furthermore, by placing the magnetic detection elements 55, 73 in the non-placement areas 54, 72 of the base sections 51, 69, it is possible to reduce the influence of the magnetic fields generated by the magnets 46, 64 and the coil sections 52, 52, . . . , 70, 70, . . . on the magnetic detection elements 55, 73, and therefore, it is possible to achieve an improvement in the detection accuracy of the pivot positions of the lens unit 19.

Further, since the magnetic detection elements 55, 73 are placed in positions facing the magnets 46, 64, in addition to securing miniaturization of the image blur correction device 15 and the imaging apparatus 1, it is possible to achieve an improvement in the detection accuracy of the pivot positions of the lens unit 19 using the magnetic detection elements 55, 73.

In addition, in the magnets 46, 64, the magnetic poles 46a, 46a, . . . , 64a, 64a . . . magnetized as north and south poles are alternately provided in the circumferential direction, and in a reference position that is at the center of each of the pivot ranges of the lens unit 19, the magnetic detection elements 55, 73 are respectively positioned to face a pole border 46b, 64b of a north pole and a south pole.

Accordingly, it is possible to effectively use a region close to the pole borders 46b, 64b in which there are few fluctuations in the curve of the magnetic field, to detect the pivot positions of the lens unit 19 and achieve an improvement in the detection accuracy of the pivot positions of the lens unit 19.

Furthermore, the propulsion force generation sections 52c, 52c, . . . , 70c, 70c, . . . of the coil sections 52, 52, . . . , 70, 70, . . . , are formed in straight lines that extend in a radiation direction respectively centering on the first pivot axis 84 and the second pivot axis 85.

Accordingly, loss of the generated propulsion force that is applied to the lens unit 19 is reduced, the driving efficiency of the lens unit 19 is improved and it is possible to achieve miniaturization of the imaging apparatus 1 and the image blur correction device 15 by reducing the size of the coil sections 52,52, . . . , 70,70, . . . by a corresponding amount.

Further, the angle between the centers of magnetic poles 46a, 46a, . . . , 64a, 64a, . . . adjacent in the circumferential direction of the magnets 46, 64 and an angle between the centers of coil sections 52,52, . . . , 70,70, . . . adjacent in the circumferential direction are configured to be the same.

Accordingly, the propulsion forces generated in each coil section 52,52, . . . , 70,70, . . . are homogenized and it is possible to achieve an improvement in the driving efficiency with respect to the lens unit 19 of the first driving motor 44 and the second driving motor 62.

Additionally, in a reference position that is at the center of the pivot ranges of the lens unit 19, the center of each coil section in the plurality of coil sections 52,52, . . . , 70,70, . . . are positioned to face a pole border 46b,46b, . . . , 64b, 64b, . . . of the magnets 46, 64.

Accordingly, homogenization of the propulsion forces generated in the coil sections 52,52, . . . , 70,70, . . . is achieved within the pivot ranges of the lens unit 19 and it is possible to achieve an improvement in the driving efficiency with respect to the lens unit 19 of the first driving motor 44 and the second driving motor 62.

Present Technology

It is possible to configure the present technology in the manners described below.

(1) An image blur correction device provided with a lens unit which has at least one lens, and can be pivoted in a first direction which is the revolving direction of a first pivot axis that is orthogonal to the optical axis of the lens, and a second direction which is the revolving direction of a second pivot axis that is orthogonal to both the optical axis and the first pivot axis, with respect to an outer housing, a first driving motor which pivots the lens unit in the first direction, and a second driving motor which pivots the lens unit in the second direction, wherein the first driving motor and the second driving motor are provided with a coil body which has a plurality of coil sections placed in a base section in a separated state in a circumferential direction based on the base section and each of the pivot axes, and a magnet which is placed to face the plurality of coil sections, a placement area in which the plurality of coil sections are placed and a non-placement area which is positioned between both ends of the placement area in the circumferential direction and in which there are no coil sections, are formed in the base sections, and the outer circumference of the non-placement area is positioned to the inside of a virtual circle that links the outer circumferences of the plurality of coil sections.

(2) The image blur correction device according to (1), wherein magnetic detection elements, which perform position detection in the pivot directions of the lens unit and are placed in the non-placement areas of the base sections.

(3) The image blur correction device according to (2), wherein the magnetic detection elements are placed in positions facing the magnets.

(4) The image blur correction device according to (2) or (3), wherein in the magnets, the magnetic poles magnetized as north and south poles are alternately provided in the circumferential direction, and in a reference position that is at the center of the pivot ranges of the lens unit in the first direction and the second direction, the magnetic detection elements are positioned to face a pole border of the north pole and south pole.

(5) The image blur correction device according to any one of (1) to (4), wherein propulsion force generation sections which generate propulsion force in the pivot directions of the lens unit are provided in the coil sections and the propulsion force generation sections are formed in straight lines that extend in a radiation direction centering on the pivot axis.

(6) The image blur correction device according to any one of (1) to (5), wherein in the magnets, the magnetic poles magnetized as north and south poles are alternately provided in the circumferential direction, and angles based on the pivot axes between the centers of magnetic poles adjacent in the circumferential direction and angles based on the pivot axis between the centers of coil sections adjacent in the circumferential direction are configured to be the same.

(7) The image blur correction device according to (6), wherein in a reference position that is at the center of the pivot ranges of the lens unit in the first direction and the second direction, the center of each coil section in the plurality of coil sections is positioned to face a pole border of the north pole and the south pole.

(8) The image blur correction device according to any one of (1) to (7), wherein the non-placement area provided in the coil body of the first driving motor is positioned in a direction that is orthogonal to both the optical axis and the first pivot axis, and the non-placement area provided in the coil body of the second driving motor is positioned in a direction that is orthogonal to both the optical axis and the second pivot axis.

(9) An imaging apparatus provided with an image blur correction device having a lens unit which has at least one lens, and an outer housing in which the lens unit is placed, which corrects image blur by pivoting the lens unit in a first direction which is a revolving direction of a first pivot axis that is orthogonal to the optical axis of the lens, and a second direction which is a revolving direction of a second pivot axis that is orthogonal to both the optical axis and the first pivot axis, with respect to the outer housing, wherein the image blur correction device is provided with a first driving motor which pivots the lens unit in the first direction, and a second driving motor which pivots the lens unit in the second direction, wherein the first driving motor and the second driving motor are provided with a coil body which has a plurality of coil sections placed in a base section in a separated state in a circumferential direction based on the base section and each of the pivot axes, and a magnet which is placed to face the plurality of coil sections, a placement area in which the plurality of coil sections are placed and a non-placement area which is positioned between both ends of the placement area in the circumferential direction and in which there are no coil sections, are formed in the base sections, and the outer circumference of the non-placement area is positioned to the inside of a virtual circle that links the outer circumferences of the plurality of coil sections.

The present disclosure contains subject matter related to that disclosed in Japanese Priority Patent Application JP 2012-000757 filed in the Japan Patent Office on Jan. 5, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction device comprising: a lens unit which has at least one lens, and can be pivoted in a first direction around a first pivot axis that is orthogonal to an optical axis of the lens, and a second direction around a second pivot axis that is orthogonal to both the optical axis and the first pivot axis, with respect to an outer housing;
   a first driving motor which pivots the lens unit in the first direction; and
   a second driving motor which pivots the lens unit in the second direction,
   wherein the first driving motor and the second driving motor are respectively provided with 1 coil body which has a plurality of coil sections placed in a base section in a separated state in a circumferential direction based on the base section and each of the pivot axes, and a magnet which is placed to face the plurality of coil sections,
   a placement area in which the plurality of coil sections are placed, and a non-placement area which is positioned between both ends of the placement area in the circumferential direction and in which there are no coil sections, are formed in the base sections, and
   the outer diameter of the non-placement area is less than the outer diameter of a virtual circle that links the outer circumferences of the plurality of coil sections.

2. The image blur correction device according to claim 1, further comprising:
   magnetic detection elements which perform position detection in the pivot directions of the lens unit and are placed in the non-placement area of the base section.

3. The image blur correction device according to claim 2, wherein the magnetic detection elements are placed in positions facing the magnets.

4. The image blur correction device according to claim 2, wherein in the magnets, magnetic poles magnetized as north and south poles are alternately provided in the circumferential direction, and
   in a reference position that is at a center of the pivot ranges of the lens unit in the first direction and the second direction, the magnetic detection elements are positioned to face a pole border of the north pole and south pole.

5. The image blur correction device according to claim 1, further comprising:
   propulsion force generation sections which generate propulsion force in the pivot directions of the lens unit and are provided in the coil sections,
   wherein the propulsion force generation sections are formed in straight lines that extend in a radial direction centering on the pivot axis.

6. The image blur correction device according to claim 1, wherein in the magnets, the magnetic poles magnetized as north and south poles are alternately provided in the circumferential direction, and
   angles based on the pivot axes between the centers of magnetic poles adjacent in the circumferential direction and angles based on the pivot axis between the centers of coil sections adjacent in the circumferential direction are configured to be the same.

7. The image blur correction device according to claim 6, wherein in a reference position that is at the center of the pivot ranges of the lens unit in the first direction and the second direction, the center of each coil section in the plurality of coil sections is positioned to face a pole border of the north pole and the south pole.

8. The image blur correction device according to claim 1, wherein the non-placement area provided in the coil body of the first driving motor is positioned in a direction that is orthogonal to both the optical axis and the first pivot axis, and the non-placement area provided in the coil body of the second driving motor is positioned in a direction that is orthogonal to both the optical axis and the second pivot axis.

9. An imaging apparatus comprising:
   an image blur correction device which has a lens unit which has at least one lens, and an outer housing in which the lens unit is placed, which corrects image blur by pivoting the lens unit in a first direction around a first pivot axis that is orthogonal to an optical axis of the lens, and a second direction around a second pivot axis that is orthogonal to both the optical axis and the first pivot axis, with respect to the outer housing,
   wherein the image blur correction device includes
      a first driving motor which pivots the lens unit in the first direction, and
      a second driving motor which pivots the lens unit in the second direction,
      wherein the first driving motor and the second driving motor are respectively provided with a coil body which has a plurality of coil sections placed in a base section in a separated state in a circumferential direction based on the base section and each of the pivot axes, and a magnet which is placed to face the plurality of coil sections,
      a placement area in which the plurality of coil sections are placed, and a non-placement area which is positioned between both ends of the placement area in the circumferential direction and in which there are no coil sections, are formed in the base sections, and
      the outer diameter of the non-placement area is less than the outer diameter of a virtual circle that links the outer circumferences of the plurality of coil sections.

10. The imaging apparatus according to claim 9, further comprising:
    magnetic detection elements which perform position detection in the pivot directions of the lens unit and are placed in the non-placement area of the base section.

11. The imaging apparatus according to claim 10, wherein the magnetic detection elements are placed in positions facing the magnets.

12. The imaging apparatus according to claim 10, wherein in the magnets, magnetic poles magnetized as north and south poles are alternately provided in the circumferential direction, and
    in a reference position that is at a center of the pivot ranges of the lens unit in the first direction and the second direction, the magnetic detection elements are positioned to face a pole border of the north pole and south pole.

13. The imaging apparatus according to claim 9, further comprising:
    propulsion force generation sections which generate propulsion force in the pivot directions of the lens unit and are provided in the coil sections,
    wherein the propulsion force generation sections are formed in straight lines that extend in a radial direction centering on the pivot axis.

14. The imaging apparatus according to claim 9, wherein in the magnets, the magnetic poles magnetized as north and south poles are alternately provided in the circumferential direction, and angles based on the pivot axes between the centers of magnetic poles adjacent in the circumferential direction and angles based on the pivot axis between the centers of coil sections adjacent in the circumferential direction are configured to be the same.

15. The imaging apparatus according to claim 14,
wherein in a reference position that is at the center of the pivot ranges of the lens unit in the first direction and the second direction, the center of each coil section in the plurality of coil sections is positioned to face a pole border of the north pole and the south pole.

16. The imaging apparatus according to claim 9,
wherein the non-placement area provided in the coil body of the first driving motor is positioned in a direction that is orthogonal to both the optical axis and the first pivot axis, and the non-placement area provided in the coil body of the second driving motor is positioned in a direction that is orthogonal to both the optical axis and the second pivot axis.

* * * * *